United States Patent
Venkata

(10) Patent No.: US 9,785,564 B2
(45) Date of Patent: *Oct. 10, 2017

(54) HYBRID MEMORY WITH ASSOCIATIVE CACHE

(71) Applicant: Seagate Technology LLC, Cupertino, CA (US)

(72) Inventor: Sumanth Jannyavula Venkata, Shakopee, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 720 days.

This patent is subject to a terminal disclaimer.

(21) Appl. No.: 13/971,778

(22) Filed: Aug. 20, 2013

(65) Prior Publication Data

US 2015/0058527 A1 Feb. 26, 2015

(51) Int. Cl.
G06F 12/00 (2006.01)
G06F 13/00 (2006.01)
G06F 13/28 (2006.01)
G06F 12/0873 (2016.01)

(52) U.S. Cl.
CPC .............................. *G06F 12/0873* (2013.01)

(58) Field of Classification Search
CPC .. G06F 3/068; G06F 12/0864; G06F 12/0808; G06F 3/0655; G06F 3/0608
USPC ......................................... 711/103, 128, 113
See application file for complete search history.

(56) References Cited

U.S. PATENT DOCUMENTS

| | | | |
|---|---|---|---|
| 4,899,230 A | 2/1990 | Sherritt | |
| 5,274,768 A | 12/1993 | Traw et al. | |
| 5,420,998 A | 5/1995 | Horning | |
| 5,644,789 A | 7/1997 | Matthews et al. | |
| 6,339,811 B1 | 1/2002 | Gaertner et al. | |
| 6,549,992 B1 | 4/2003 | Armangau et al. | |
| 6,948,015 B2 | 9/2005 | Ogasawara et al. | |
| 7,181,578 B1 | 2/2007 | Guha et al. | |
| 7,305,526 B2 | 12/2007 | Benhase et al. | |
| 7,613,876 B2 | 11/2009 | Bruce et al. | |
| 7,769,970 B1 | 8/2010 | Yeh et al. | |
| 7,979,631 B2 | 7/2011 | Ahn et al. | |
| 7,996,642 B1 | 8/2011 | Smith | |
| 8,015,360 B2 | 9/2011 | Hong et al. | |

(Continued)

FOREIGN PATENT DOCUMENTS

EP 1890236 2/2008

OTHER PUBLICATIONS

U.S. Appl. No. 13/542,990, filed Jul. 6, 2012, Sawin et al.

(Continued)

*Primary Examiner* — Sheng-Jen Tsai

(74) *Attorney, Agent, or Firm* — Hollingsworth Davis, LLC

(57) ABSTRACT

A hybrid memory system includes a primary memory comprising a host memory space arranged as memory sectors corresponding to host logical block addresses (host LBAs). A secondary memory is implemented as a cache for the primary host memory. A hybrid controller is configured directly map the clusters of host LBAs to clusters of secondary memory. The secondary memory clusters correspond to a memory space of the cache. Mapping of the host LBA secondary memory clusters is fully associative such that any host LBA cluster can be mapped to any secondary memory cluster.

19 Claims, 22 Drawing Sheets

(56) References Cited

U.S. PATENT DOCUMENTS

| | | | |
|---|---|---|---|
| 8,032,700 B2 | 10/2011 | Bruce et al. | |
| 8,180,964 B1 | 5/2012 | Koh et al. | |
| 8,195,881 B2* | 6/2012 | Bohn et al. | 711/122 |
| 8,341,339 B1 | 12/2012 | Boyle et al. | |
| 8,489,820 B1 | 7/2013 | Ellard | |
| 8,583,879 B2 | 11/2013 | Na et al. | |
| 9,367,247 B2* | 6/2016 | Venkata | G06F 3/061 |
| 9,477,591 B2* | 10/2016 | Jannyavula Venkata | G06F 12/0246 |
| 9,529,724 B2* | 12/2016 | Jannyavula Venkata | G06F 12/0866 |
| 2002/0002655 A1 | 1/2002 | Hoskins | |
| 2002/0176430 A1 | 11/2002 | Sangha et al. | |
| 2003/0105937 A1 | 6/2003 | Cooksey et al. | |
| 2003/0105938 A1 | 6/2003 | Cooksey et al. | |
| 2003/0105940 A1 | 6/2003 | Cooksey et al. | |
| 2003/0196042 A1 | 10/2003 | Hopeman et al. | |
| 2003/0200393 A1 | 10/2003 | Cornaby et al. | |
| 2004/0123043 A1 | 6/2004 | Rotithor et al. | |
| 2005/0108491 A1 | 5/2005 | Wong et al. | |
| 2005/0114606 A1 | 5/2005 | Matick et al. | |
| 2005/0172074 A1 | 8/2005 | Sinclair | |
| 2005/0198438 A1* | 9/2005 | Aoki | G06F 12/0817 711/133 |
| 2006/0184949 A1 | 8/2006 | Craddock et al. | |
| 2006/0248387 A1 | 11/2006 | Nicholson et al. | |
| 2007/0022241 A1 | 1/2007 | Sinclair | |
| 2007/0136523 A1 | 6/2007 | Bonella et al. | |
| 2007/0250665 A1 | 10/2007 | Shimada | |
| 2008/0059694 A1 | 3/2008 | Lee | |
| 2008/0162849 A1 | 7/2008 | Savagaonkar et al. | |
| 2008/0209131 A1 | 8/2008 | Kornegay et al. | |
| 2009/0055595 A1 | 2/2009 | Gill et al. | |
| 2009/0106481 A1 | 4/2009 | Yang et al. | |
| 2009/0157918 A1 | 6/2009 | Jin et al. | |
| 2009/0193193 A1 | 7/2009 | Kern | |
| 2009/0300628 A1 | 12/2009 | Patil et al. | |
| 2010/0023682 A1 | 1/2010 | Lee | |
| 2010/0115172 A1 | 5/2010 | Gillingham et al. | |
| 2010/0217952 A1 | 8/2010 | Iyer et al. | |
| 2010/0325352 A1 | 12/2010 | Schuette et al. | |
| 2011/0055458 A1* | 3/2011 | Kuehne | G06F 12/0246 711/103 |
| 2011/0145489 A1 | 6/2011 | Yu et al. | |
| 2012/0191936 A1 | 7/2012 | Ebsen et al. | |
| 2012/0210041 A1* | 8/2012 | Flynn et al. | 711/3 |
| 2012/0266175 A1 | 10/2012 | Zheng | |
| 2012/0311237 A1 | 12/2012 | Park | |
| 2012/0311269 A1* | 12/2012 | Loh | G06F 12/126 711/133 |
| 2012/0317364 A1 | 12/2012 | Loh | |
| 2013/0024625 A1 | 1/2013 | Benhase et al. | |
| 2013/0179486 A1 | 7/2013 | Lee et al. | |
| 2013/0191601 A1 | 7/2013 | Peterson et al. | |
| 2013/0212319 A1 | 8/2013 | Hida et al. | |
| 2013/0246688 A1 | 9/2013 | Kanno et al. | |
| 2013/0268728 A1 | 10/2013 | Ramanujan et al. | |
| 2013/0339617 A1 | 12/2013 | Averbouch et al. | |
| 2014/0013025 A1* | 1/2014 | Jannyavula Venkata | 711/103 |
| 2014/0013026 A1* | 1/2014 | Jannyavula Venkata | G06F 12/0246 711/103 |
| 2014/0207997 A1 | 7/2014 | Peterson et al. | |
| 2014/0241092 A1 | 8/2014 | Ha | |
| 2014/0281134 A1 | 9/2014 | Eitan et al. | |
| 2015/0033226 A1 | 1/2015 | Phelan et al. | |
| 2015/0058525 A1* | 2/2015 | Venkata | 711/103 |
| 2015/0058526 A1* | 2/2015 | Venkata | G06F 3/061 711/103 |
| 2015/0058527 A1* | 2/2015 | Venkata | 711/103 |
| 2015/0058683 A1* | 2/2015 | Venkata et al. | 714/53 |

OTHER PUBLICATIONS

U.S. Appl. No. 13/543,036, filed Jul. 6, 2012, Sawin et al.
U.S. Appl. No. 13/543,079, filed Jul. 6, 2012, Venkata et al.
U.S. Appl. No. 13/543,100, filed Jul. 6, 2012, Venkata et al.
U.S. Appl. No. 13/543,123, filed Jul. 6, 2012, Sawin et al.
U.S. Appl. No. 13/543,303, filed Jul. 6, 2012, Venkata et al.
Hallnor et al., "A Fully Associative Software-Managed Cache Design", ISCA '00 Proceedings of the 27th Annual International Symposium on Computer Architecture, 2000, pp. 107-116.
Ahmadi et al., "A Cache Architecture for Counting Bloom Filters", 15th IEEE International Conference on Networks, 2007, pp. 218-223.
File History for U.S. Appl. No. 13/543,079.
File History for U.S. Appl. No. 13/543,100.
File History for U.S. Appl. No. 13/543,303.

* cited by examiner

HYBRID MEMORY WITH ASSOCIATIVE CACHE

SUMMARY

A hybrid memory system includes a nonvolatile primary memory comprising a host memory space arranged as memory sectors corresponding to host logical block addresses (host LBAs). A secondary memory is implemented as a cache for the primary host memory. A hybrid controller is configured to directly map the clusters of host LBAs to clusters of secondary memory. The secondary memory clusters correspond to a memory space of the cache. Mapping of the host LBA clusters to the secondary memory clusters is fully associative such that any host LBA cluster can be mapped to any secondary memory cluster.

A method of implementing a hybrid memory system includes mapping clusters of host logical block addresses (LBAs) corresponding to a host LBA space to secondary memory clusters. The host LBA space corresponds to a memory space of a nonvolatile primary memory and the secondary memory clusters corresponding to memory space of a secondary memory. The secondary memory may be arranged to operate as a fully associative cache for the primary memory, wherein any host LBA cluster can be directly mapped to any secondary memory cluster.

A hybrid memory system includes a hard magnetic disk drive (HDD) which comprises a memory space arranged as memory sectors corresponding to host logical block addresses (LBAs). A flash memory is configured to serve as a cache for the HDD. A hybrid controller is configured to map the clusters of host LBAs to clusters of secondary memory, the secondary memory clusters corresponding to a memory space of the flash memory. The mapping of the host LBA clusters to the secondary memory clusters being fully associative wherein any host LBA cluster can be mapped to any secondary memory cluster.

These and other features and aspects of the various embodiments disclosed herein can be understood in view of the following detailed discussion and the accompanying drawings.

DETAILED DESCRIPTION

Some memory devices use at least two types of memory in a hybrid or tiered memory system, where at least one type of memory is used as a primary memory and at least one other type of memory is used as a secondary memory that operates as a cache. The primary memory may have greater storage capacity but slower access times than the secondary memory, for example. In this arrangement, the secondary memory can serve as a read cache and/or a write cache for the primary memory. One example of such a tiered memory device is a hybrid drive, in which the primary memory may comprise nonvolatile memory such as magnetic disk, magnetic tape, and/or optical disk and the secondary memory may comprise solid state flash memory, and/or the secondary memory may be a nonvolatile or volatile memory with or without battery backup. Note that the terms "primary memory" and "secondary memory" are used herein for identification of components used in a hybrid memory system and to denote differences in memory (e.g., usage, capacity, performance, memory class or type, etc.) and not necessarily order or preference. Furthermore, although examples provided herein refer to the primary memory as magnetic disk and to secondary memory as flash memory, the disclosed approaches are applicable to any types of primary and secondary memory.

Embodiments described herein relate to systems and methods for mapping primary memory space to secondary memory space. According to various implementations, the memory space of the secondary memory is arranged to operate as a fully associative cache for the primary memory.

Figure 1A:
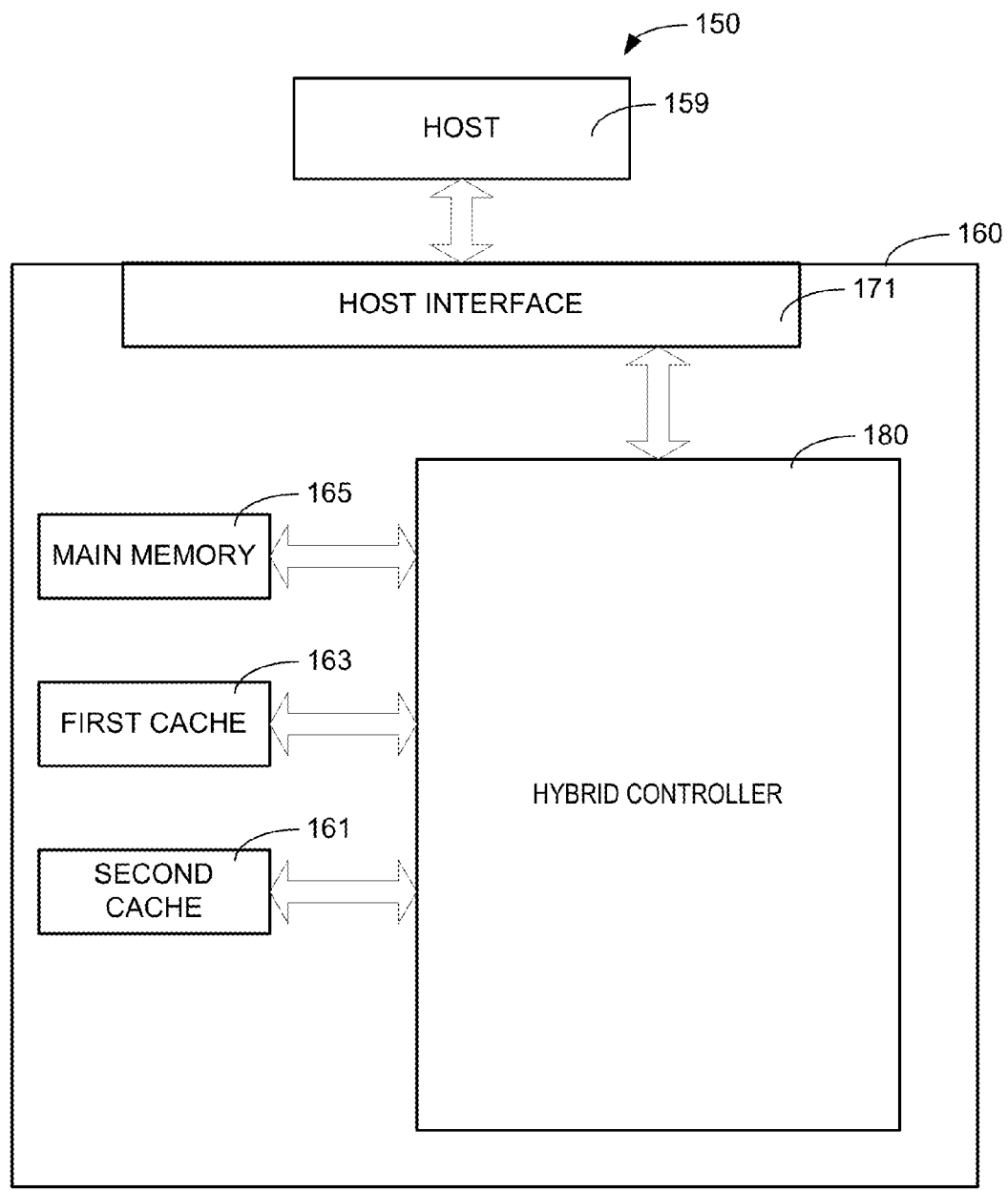
FIG. 1A is a block diagram of a hybrid memory system configured to manage memory access requests in accordance with some embodiments.

FIG. 1A is a diagram of a system 150 that includes a hybrid memory 160 comprising a number of memory components including a main memory 165, a first cache 163 and a second cache 161. The hybrid memory 160 is coupled to a host processor 159 through a host interface 171. The host interface 171 communicatively couples the host processor 159 to a hybrid controller 180. The first cache 163 and the second cache 161 can be configured to temporarily store data transferred to or from the host 159 to enhance throughput to the main memory 165. The main memory 165 includes a memory space that corresponds to a number of memory sectors, each sector addressable using a unique a logical block address (LBA). The sectors of the main memory 165 are directly accessible by the host 159 using the LBAs, and thus the corresponding LBAs of the main memory are referred to herein as host LBAs.

The host 159 sends memory access requests to the hybrid drive 160 to read or write data. The memory access requests may specify a host LBA range used for the operation of the memory access request. For example, a memory access request from the host 159 may request that a host LBA range be written to the hybrid drive 160 and/or a memory access request may request that a host LBA range be read from the hybrid drive 160. The memory access requests received from the host 159 are managed by the hybrid controller 180 to cause data to be written to and/or read from the hybrid drive with optimal efficiency. The second cache 161 in this example may optionally be a type of read cache referred to as read-only, in that only data marked for read operations by the host 159 are placed in the second cache 161. In such a configuration, data marked for writing to the main memory 165 are sent to the main storage 165, either directly or via the first cache 163.

According to some embodiments, the hybrid memory device 160 (also denoted hybrid drive) may be implemented using a controller 180 configured as a hierarchy of abstraction layers. Pairs of the abstraction layers are communicatively coupled through application programming interfaces (APIs). The organization of the hybrid controller 180 into abstraction layers to some extent allows each layer to work relatively independently and/or can reduce potential conflicts that arise from processing multiple threads of execution. For purposes of discussion, some examples provided below are based on the use of a magnetic disk as the main memory, dynamic random access memory as the first (or primary) cache, and solid state flash memory as the second (or secondary) cache. It will be apparent to those skilled in the art that the various memory components 161, 163, 165 are not restricted to these types of memory and may be implemented using a wide variety of memory types.

In some configurations, the cache 161 may be configured as a secondary cache, and may be faster and smaller than the main storage 165. The cache 163 is a primary cache, and may be faster and smaller than the secondary cache 161. For example, current read/write requests from the host 159 may be processed first via the primary cache 163 (e.g., identified by the data's logical block address). This enables host commands to complete quickly should the requested data be stored in the primary cache 163. For host read requests, if there is a miss in the primary cache 163 i.e., the requested data is not present in the primary cache, the requested data may be searched for in the secondary cache 161. If not found in either, requested data may be accessed via the main storage 165. Some of the data stored in the primary cache 163 may either be copied or moved to the secondary cache 161 as new requests come in. The copying/movement from primary cache 163 to secondary cache 161 may also occur in response to other events, e.g., a background scan. Both copying and moving involve placing a copy of data associated with an LBA range in the secondary cache, and moving may further involve freeing up some the LBA range in the primary cache for other uses, e.g., storing newly cached data.

Figure 1B:
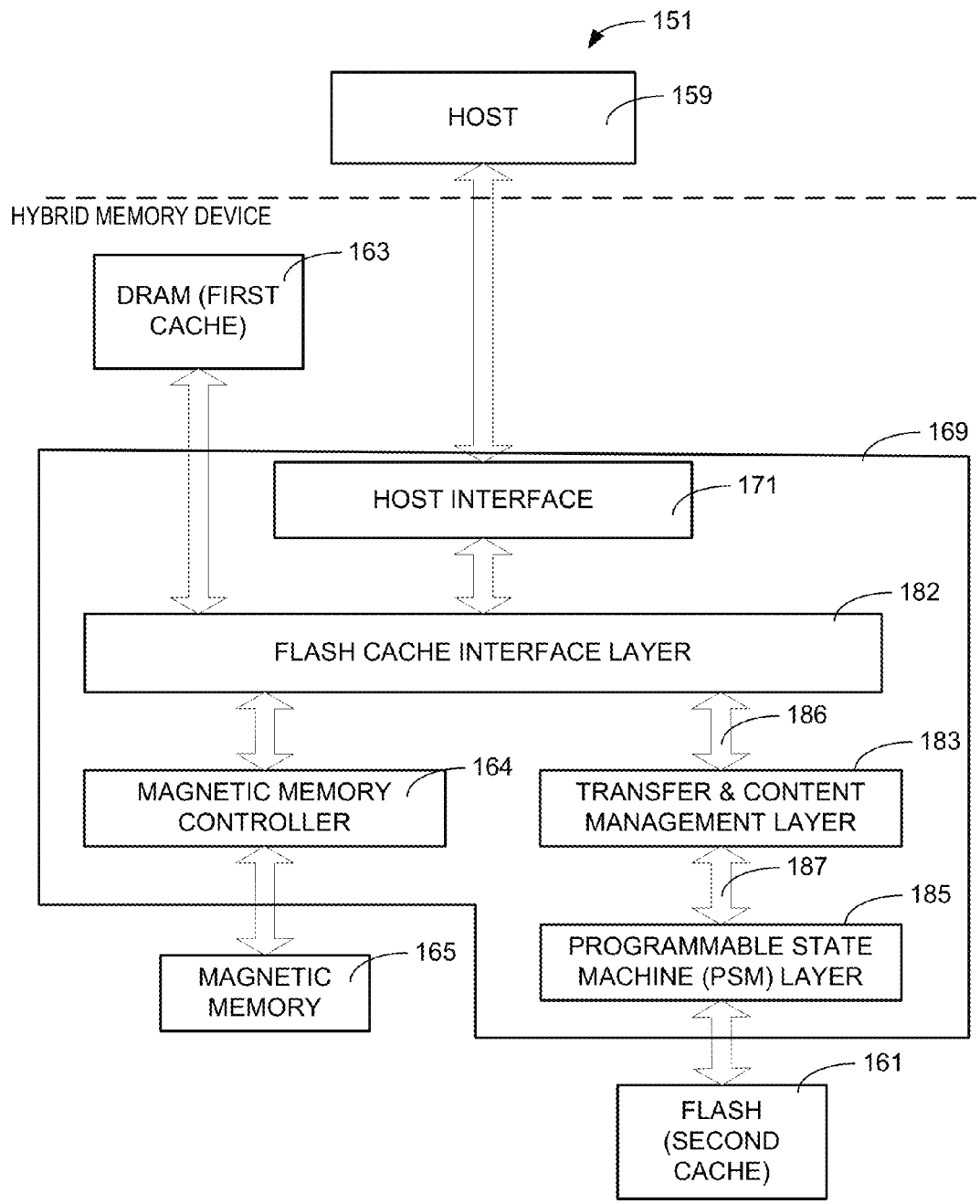
FIG. 1B is a block diagram of a hybrid memory system that includes a magnetic disk as a primary memory and a flash memory as a secondary memory, the hybrid memory system configured to manage memory access requests in accordance with some embodiments.

FIG. 1B illustrates a more detailed version of a system 151 that includes a host processor 159 coupled to a hybrid memory device. The hybrid memory device includes a magnetic memory 165 which serves as the main memory, dynamic random access memory (DRAM) 163 arranged as a first cache, and flash memory 161 arranged as a second cache. In this configuration, the flash cache 161 acts as a second cache, and may be faster but smaller than the main memory 165. The DRAM 163 serves as the first cache, and may be faster but smaller than the flash cache 161. While there is some processing and data transfer overhead in using the one or more caches 163, 161, the faster storage media used by the caches can enhance overall performance of the apparatus hybrid memory device.

The host processor 159 communicates with the hybrid memory device (also referred to herein as hybrid drive) through a host interface 171. As previously discussed, the main memory 165 includes a memory space that corresponds to a number of memory sectors, each sector addressable using a unique a logical block address (LBA). The sectors of the main memory 165 are directly accessible by the host 159 using the LBAs, and thus the corresponding LBAs of the main memory 165 are referred to herein as host LBAs.

The host 159 sends memory access requests to the hybrid memory device, for example, the host 159 may request that data be written to and/or read from the hybrid memory device. The host interface 171 is configured to transfer memory access requests from the host 159 to other components of the hybrid memory device and to transfer data between the host 159 and the hybrid memory device.

The hybrid controller 169 illustrated in FIG. 1B includes number of layers 182, 183, 185 wherein each layer communicates to its nearest neighboring layer(s), e.g., through a set of requests. For example, each layer 182, 183, 185 may only communicate to its nearest neighboring layer(s) without communicating to other layers. As an example, the layer 182 may only communicate directly to layer 183 and the host interface 171, without communicating directly with the layer 185 or to the flash 161. As an operation, such as a memory access request from the host 159, is being carried out, each layer 182, 183, 185 is configured to pass control to the next lower layer as the operation is implemented.

The example illustrated in FIG. 1B includes three layers 182, 183, 185 which are described in terms applicable to the use of flash memory as a cache. It will be appreciated that these terms are not restrictive, and if other types of memory were used as the secondary memory, if desired, different terminology could be used to reflect the type of secondary memory. Nevertheless, the basic functions of the layers can be similar, regardless of the type of memory used for primary and/or secondary memory, and/or the terminology used to describe the layers.

The layers illustrated in FIG. 1B include: the flash cache interface (FCI) layer 182; the flash cache control and transfer management (FCTM) layer 183; and the programmable state machine (PSM) layer 185. Requests and/or data may be passed between the layers as indicated by arrows 186, 187 from a higher layer to the next lower layer starting with the FCI layer 182 and proceeding to the PSM layer 185 which interacts directly with the flash memory 161. The layered architecture of the hybrid controller 169 described herein allows for handling host memory access requests which can be serviced from either the magnetic memory 165 or one of the caches 163, 161 The layered structure used in conjunction with the flash cache 161 can be configured to achieve specified rates and response times for servicing memory access requests.

The FCI layer 182 decides whether a host read request should be serviced from the primary magnetic memory 165 or from one of the caches 163, 161. The FCI layer 182 implements processes to determine which data should be promoted to the flash secondary cache 161 and/or the primary cache 163 based on various criteria to achieve optimal workload for the hybrid memory device. The flash content and transfer management (FCTM) layer 183 maintains a mapping, e.g., a fully associative mapping as discussed below, of the host LBAs to a memory space corresponding to the flash memory space arranged in clusters. The FCTM layer 183 interacts with programmable state machine (PSM) layer 185 and performs tasks such as optimal scheduling of promotion requests among dies of the flash (referred to as die scheduling), wear leveling, garbage collection and so forth). The PSM layer programs hardware controllers to generate the required signals to read from and write to the flash 161, for example.

In some cases, one or more of the layers 182, 183, 185 of the hybrid controller 169 may be implemented by circuitry and/or by one or more processors, e.g., such as reduced instruction set computer (RISC) processors available from ARM. In some cases each layer 182, 183, 185 may be implemented by a separate processor. The processes discussed herein are implementable in hardware (interconnected electronic components that carry out logic operations) and/or by a processor implementing software instructions, e.g., stored in a computer readable medium, and/or by any combination of hardware and software.

The HDD host LBA space and flash physical address space are partitioned into units of clusters that may be sized to contain a whole number of sectors of data. The flash space may be broken up into dies, blocks, and/or pages. A block contains multiple pages. For example, a block may contain 128 or 256 pages and the pages may be 8 or 16 KB in size. A die contains multiple blocks. For example a die can contain 4096 or 8192 blocks. A block is erased before being programmed. Erase commands operate at the block level and read and program commands operate at the page level. Multi-plane NAND flash parts support operations on more than one page in a single flash command as long as the specified pages are in different planes. In flash geometry, according to some embodiments, a cluster is defined to contain one or more map units (MU). A MU is defined to be the maximum amount of data that can be transferred to or from the flash in a single flash operation. An MU may be n pages. For example, the MU for a dual plane flash may be two pages and for quad plane may be four pages. A cluster may be defined as one or more MUs. Clusters that contain one MU may use more memory that tracks the contents of the flash cache. Garbage collection units (GCUs) may be defined to contain as many blocks as there are planes. This allows the erase of a GCU to be completed with a single multi-plane erase command to the flash.

Figure 2:
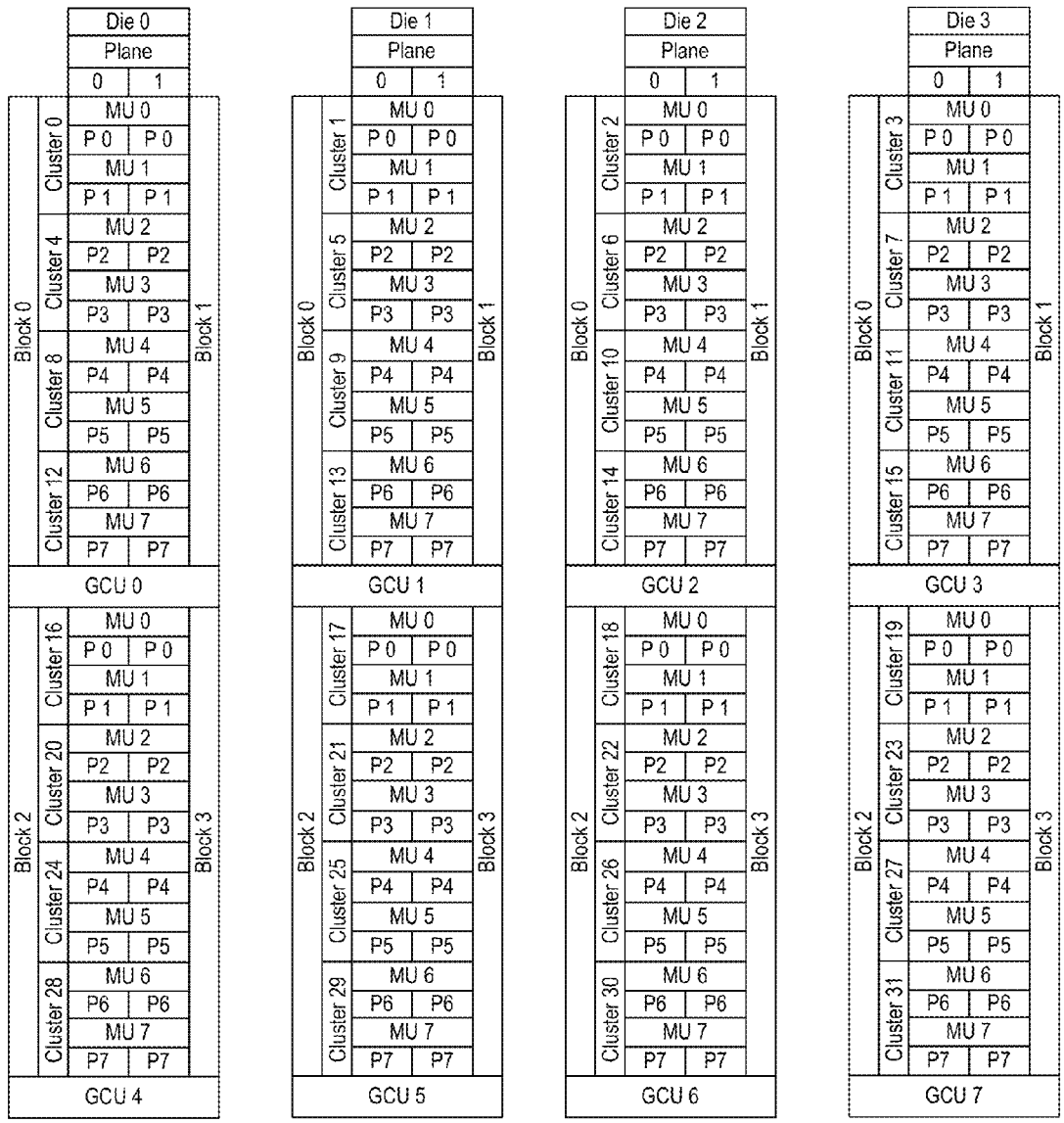
FIG. 2 illustrates a fully associative cache structure according to some embodiments.

FIG. 2 illustrates a way to partition the flash into clusters for four die, dual plane system. Each cluster spans two planes and two MUs. There are two GCUs per die. Clusters and GCUs are intentionally defined not to span die in order to be able to handle full die failures. If a die failure results in a loss of data, only the data residing on that die will be lost. Data located in other dies will be preserved. In some implementations, and as shown in FIG. 2, the host sectors are aligned with the cluster boundaries. In other words, a host LBA is not allowed to span more than one host LBA cluster. According to various implementations, each flash comprises n planes.

Figure 3A:
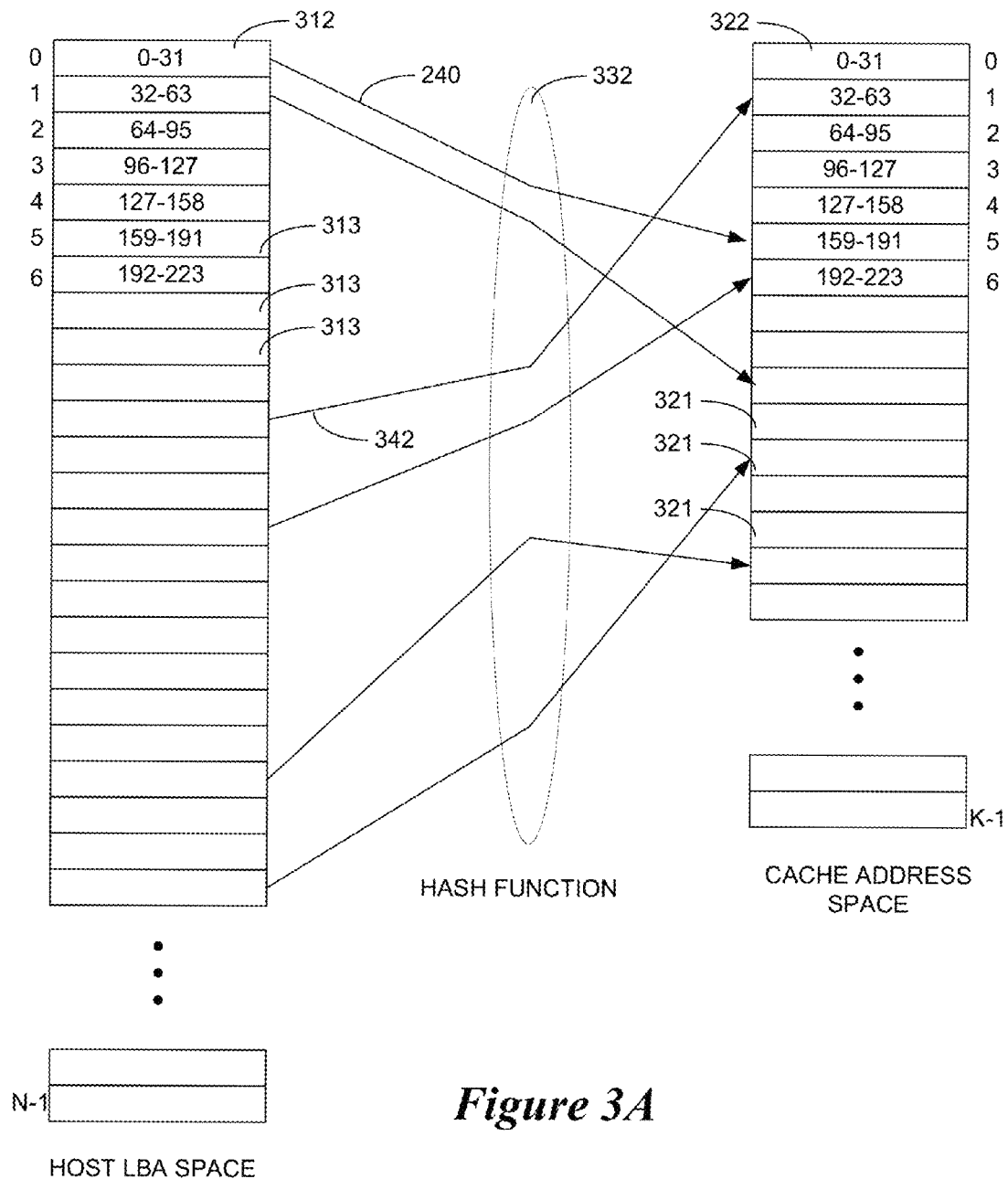
FIG. 3A illustrates a fully associative cache structure according to some embodiments.

The mapping of the host LBA clusters to the cache clusters, e.g., flash cache clusters, by the FCTM layer is fully associative meaning that any host LBA cluster can be mapped to any of the cache clusters, so long as there is room in the cache. FIG. 3A diagrammatically depicts mapping of the host LBA space 312 to the cache address space (clusters) 322. In the FCTM layer, the host LBA space is clustered into clusters of host LBAs. In the host LBA space 312 each cluster 313 of host LBAs is uniquely identified by a number between 0 and N−1 and each cluster 313 includes n contiguous sectors. The number of sectors per cluster, n, may be fixed and can depend on the size of a host sector, the geometry of the flash memory, the error correction code (ECC) used to store data in the flash memory, and/or other factors. In the example illustrated in FIG. 2, n=32, however, in other implementations, n may be greater than or less than 32. Furthermore, in general, n need not be a power of two.

The mapping from host LBA space 312 to cache address space 322 is accomplished by a hash function. The hash function can support fully associative caching with regard to clusters. In other words, the hash function 332 allows any host cluster 313 to be mapped to any flash cluster 321 as indicated by arrows 342. However, the mapping may be constrained such that any host LBA can exist in only one cache cluster at any given time. The offset within a cluster where an LBA is located within a cluster is fixed and is can be determined by the host LBA modulo the number of host LBAs per cluster, i.e., the remainder resulting from dividing the host LBA by n. Allowing a host LBA cluster to be mapped into any cache cluster and ensuring that promotes and invalidates implemented by the FCTM layer are aligned to cluster boundaries avoids cache fragmentation.

Figure 3B:
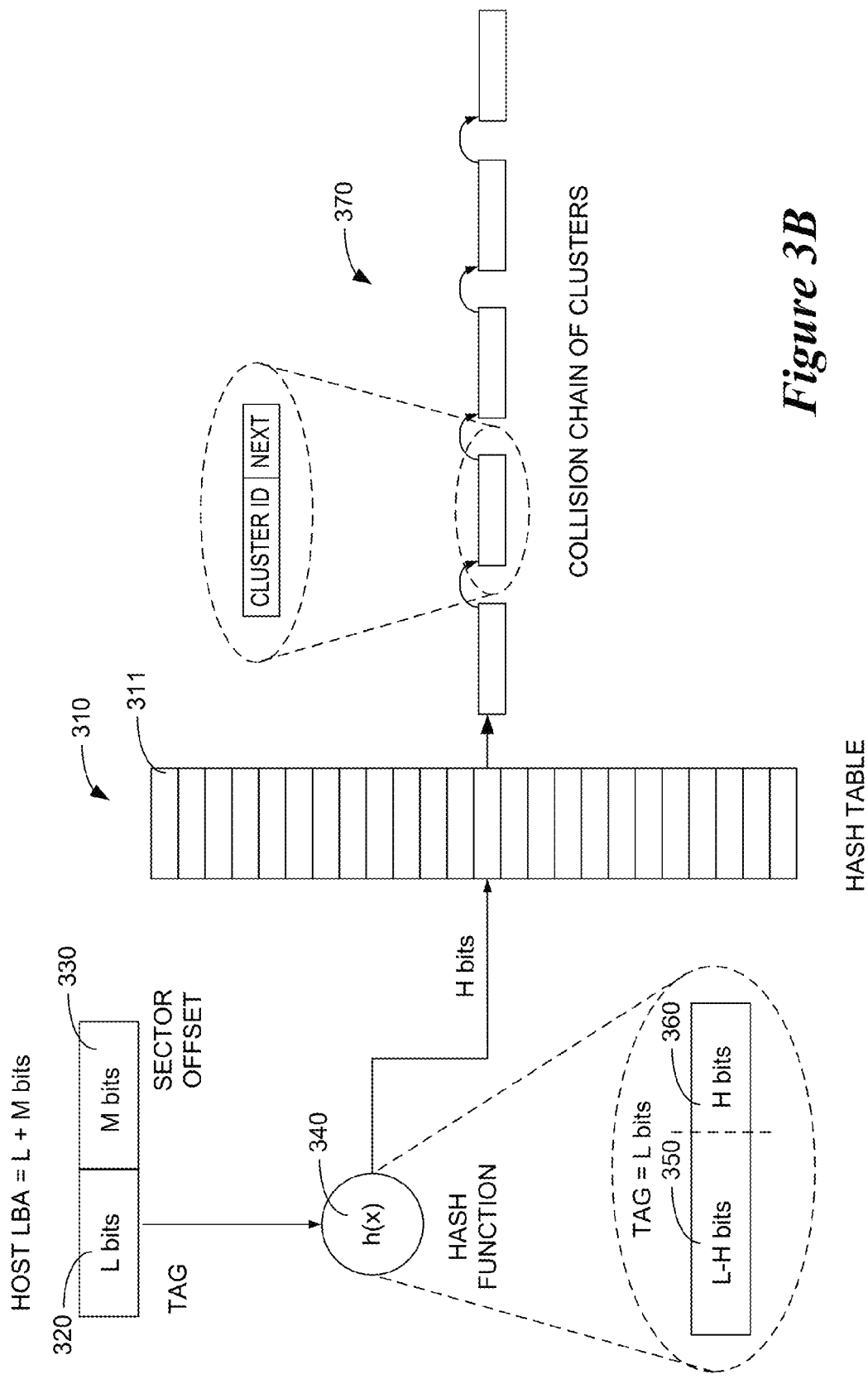
FIG. 3B illustrates a process of mapping host logical block addresses (LBAs) to cache LBAs in accordance with some embodiments.

FIG. 3B is a diagram that illustrates the implementation of the hash function which provides a process for keeping track of the host LBA clusters stored in the flash. In this example, the hash function 340 is relatively simple, although more complex hash functions could be used. For most implementations, the hash function that is fastest is generally optimal. A hash table 310 is used to keep track of the mapping of the host LBA space to the cache space. A number, L, of the more significant bits 320 of the host LBA are used as a tag to identify the corresponding cluster in the cache. The remaining M less significant bits 330 of the host LBA are used as a sector offset that identifies the sectors within the cache cluster.

The hash function 340 is used to convert the tag (upper L bits of the host LBA) into a hash table index in the hash table 310. The entry in the hash table 310 indicated by the hash table index 311 (the tag converted by the hash function) points to one or more clusters in the cache. For example, for a host LBA of L+M bits, the lower M bits can be used as a sector offset to identify the sector within an cache cluster. The remaining L bits are used for the tag. The hash function 340 operates on the tag 320 to generate the index into the hash table 310. For example, the hash function may discard the upper L–H bits 350 of the tag and use the lower H bits as the hash table index. Discarding a portion of the tag means that in some cases a number of different host LBAs will map to the same entry in the hash table, and a collision will occur. An entry 311 in the hash table 310 is associated with more than one cluster identification (ID) only if a collision occurs. In this scenario, $2^M$ host LBAs mapped to a cluster will all have the same tag. If the hash function discards the upper bits leaving only H lower bits for the hash table index, the theoretical maximum number of possible collisions is $2^{(L-H)}$. The L–H bits of the tag identify the cluster ID. The collisions are resolved using a linked list 370. The linked list contains the cluster IDs that are hashed to the same entry in the hash table (i.e., have the same hash index). To access a particular cluster, the linked list is scanned for an entry with the correct cluster ID. For example, when the FCI layer requests a look up involving a particular host LBA cluster, the FCTM layer applies the hash function, and if there is a collision (two clusters that map to the same space) then the FCTM layer traverses through the linked list to locate the requested cluster.

The above description assumes that the number of host sectors per cluster is a power of two. However, non-power of two sector sizes may also be used. A representative set of host sector sizes that are supportable by the fully associative cache structure described herein include, but is not limited to, the following sector sizes: 512, 520, 524, 528, 4096, 4160, 4192, and 4224 bytes. For example, based on sector to cluster mapping calculations, there may be 30 5XX byte sectors per cluster (assuming a cluster is 16 KB of the flash, such as an 8 KB flash page size with dual plane support).

Non-powers of two can be handled by modifying the mapping described above as follows: The tag is determined as tag=host LBA/sectors per cluster, where / indicates an integer division via truncation and the host sector offset within the cluster is determined by host LBA modulo the sectors per cluster, i.e., the remainder after dividing the host LBA by the sectors per cluster.

The division and modulo operations can be implemented by executing a multiply instruction, e.g., a 64 bit multiply instruction on the FCTM processor, assuming the FCTM processor supports 64 bit multiple instructions. To facilitate the multiply, the value p=0xFFFFFFFF/sectors per cluster is pre-computed—is a constant value. The tag is now determined by tag=(host LBA*p)>>32, where * indicates a 64 bit multiply operation and where >>32 means that the result of (host LBA*p) is right shifted 32 times. Using this process, there is a possibility that the tag is off by one. To correct for this occurrence, the tag is incremented by one if the following condition is satisfied: (Host LBA−tag*sectors per cluster≥sector per cluster. The remainder can be similarly determined.

The FCTM maintains a cluster use list and a cluster free list in metadata of the FCTM. Cache clusters in the use list are those that are currently being used and correspond to valid data stored in the flash. Cache clusters in the free list are those clusters that are available to be written to. The cache can become saturated meaning that there are no cache clusters in the free list. If the cache is saturated, there is no space available in the flash to implement requests from the FCI layer to promote (write) data to the cache unless an eviction occurs. During execution of a promotion request, if the cache is saturated, the FCTM layer performs an eviction before allocating cache clusters for the promotion. For example, the FCTM layer may perform an eviction by evicting cache clusters identified as the least valuable to make room for the new clusters to be written. In other words, if the promotion request involves writing J clusters to the cache, then the FCTM module evicts the J least valuable clusters from the cache.

The FCTM layer maintains a most valuable least valuable (MVLV) list to identify the least valuable clusters. The MVLV list may comprise a linked list of all the cache clusters in ranked order according to a value level determined by the FCTM module. The value level of a cluster may be based on how recently the cache cluster was used and/or may be based on how frequently the cache cluster was used. The MVLV list may be updated in conjunction with the execution of some memory access requests. For example, when a read request is executed by the FCTM, the cache clusters involved in the request are moved to the head of the MVLV list making them the most valuable. Similarly, when a promotion request is executed by the FCTM, the cache clusters involved in the promotion request are moved to the head of the list making them the most valuable.

Figure 4:
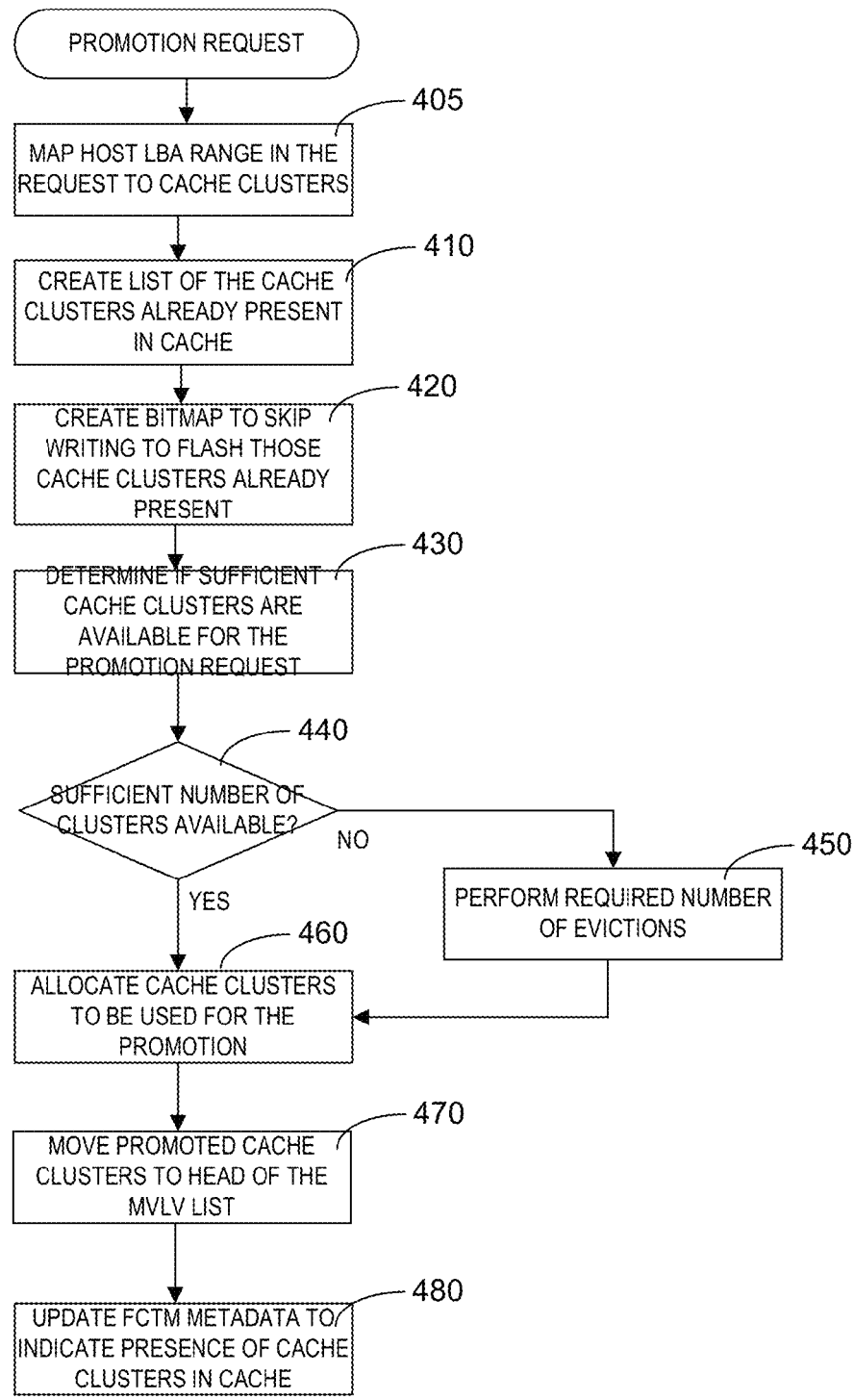
FIG. 4 is a flow diagram that conceptually illustrates a promotion request that may be implemented by the hybrid controller.

An approach for implementing a promotion request by the FCTM layer is conceptually illustrated in the flow diagram of FIG. 4. The promotion request from the FCI layer includes a cluster aligned host LBA range to be promoted to the cache. A cluster aligned host LBA range is an LBA range that starts at the beginning of a cluster and ends at the end of a cluster. The cluster aligned LBA range does not include partial clusters.

In response to the promotion request, the FCTM layer maps 405 the cluster aligned host LBA range of the request to cache clusters. The FCTM determines if the cluster aligned host LBA range corresponds to any cache clusters. If so, these cache clusters are already present in the flash and are referred to herein as overlapped clusters. The FCTM layer creates 410 a list of the overlapped cache clusters. Because these overlapped cache clusters are already stored in the flash, re-writing the overlapped clusters to the flash is unnecessary. To avoid re-writing clusters, the FCTM layer creates 420 a bitmap of the overlapped cache clusters and skips writing these clusters to the flash when executing the promotion request. Identifying overlapped clusters to avoid re-writing the overlapped clusters to the flash reduces memory wear. For example, if all cluster aligned host LBAs in the promotion request are already stored in the cache (the host LBA range of the promotion request is entirely present in overlapped clusters), no data transfer to the cache occurs. If some host LBAs of the promotion request are already present in the cache, then the FCTM uses the bitmap to exclude the overlapped cache clusters already present in the cache from being re-written to the cache.

The FCTM layer determines 430 if there are sufficient cache clusters available to implement the promotion request by checking the use list maintained in the FCTM metadata. If not 440, the FCTM evicts 450 the required number of cache clusters. The clusters at the tail of the MVLV list are chosen for eviction. The FCTM allocates 460 cache clusters to be used for the promotion and executes the promotion by writing to the flash. In this example, the promoted cache clusters are now most valuable because they are the most recently used cache clusters. The promoted cache clusters are moved 470 to the head of the MVLV list. The FCTM maintains a cluster use list and a cluster free list in metadata of the FCTM. Cache clusters in the use list are those that are present in the cache. Cache clusters in the free list are those available to be written to. In conjunction with execution of a promotion request, the FCTM metadata is updated 480 to indicate that the promoted cache clusters are in use.

Figure 5:
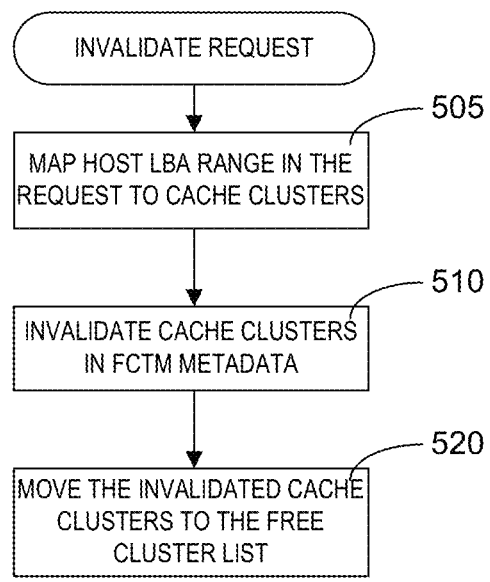
FIG. 5 is a flow diagram that conceptually illustrates an invalidate request that may be implemented by the hybrid controller.

FIG. 5 is a flow diagram that conceptually illustrates an invalidate request issued from the FCI layer to the FCTM layer and implemented by the FCTM layer. Note that implementation of an invalidate request does not require any work performed by the flash. An invalidate request issued by the FCI layer identifies a cluster aligned range of host LBAs to be invalidated. The FCTM maps 505 the cluster aligned host LBA range to the cache clusters. The cache clusters are invalidated 510 (marked as containing invalid data) in the FCTM metadata. The invalidated clusters may be moved 520 to the free cluster list maintained by the FCTM in metadata.

Figure 6:
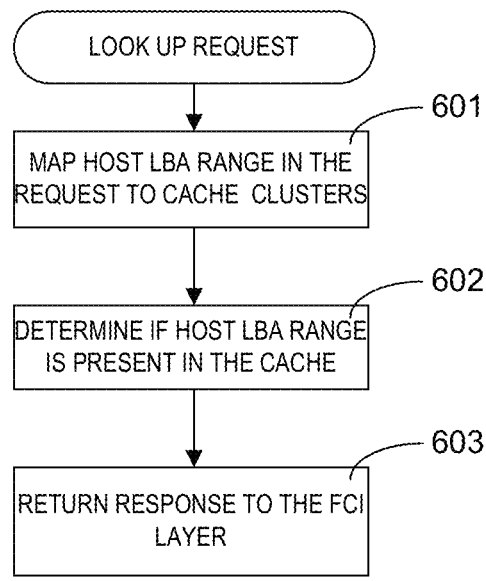
FIG. 6 is a flow diagram that conceptually illustrates a look up request that may be implemented by the hybrid controller.

FIG. 6 is a flow diagram that conceptually illustrates a look up request issued by the FCI layer to the FCTM layer and implemented by the FCTM layer. Note that implementation of a look up request does not require any work performed by the flash. A look up request is typically issued by the FCI layer in response to a host read command to determine whether the host LBA range is stored in the cache. The FCI layer can request a look up for any host LBA range, the requested host LBA range need not be cluster aligned. The FCTM layer maps 601 the host LBA range to the cache clusters and determines 602 if the host LBA range is stored, e.g., fully stored, in the cache. The FCTM layer returns 603 the response to the look up the FCI layer.

Figure 7:
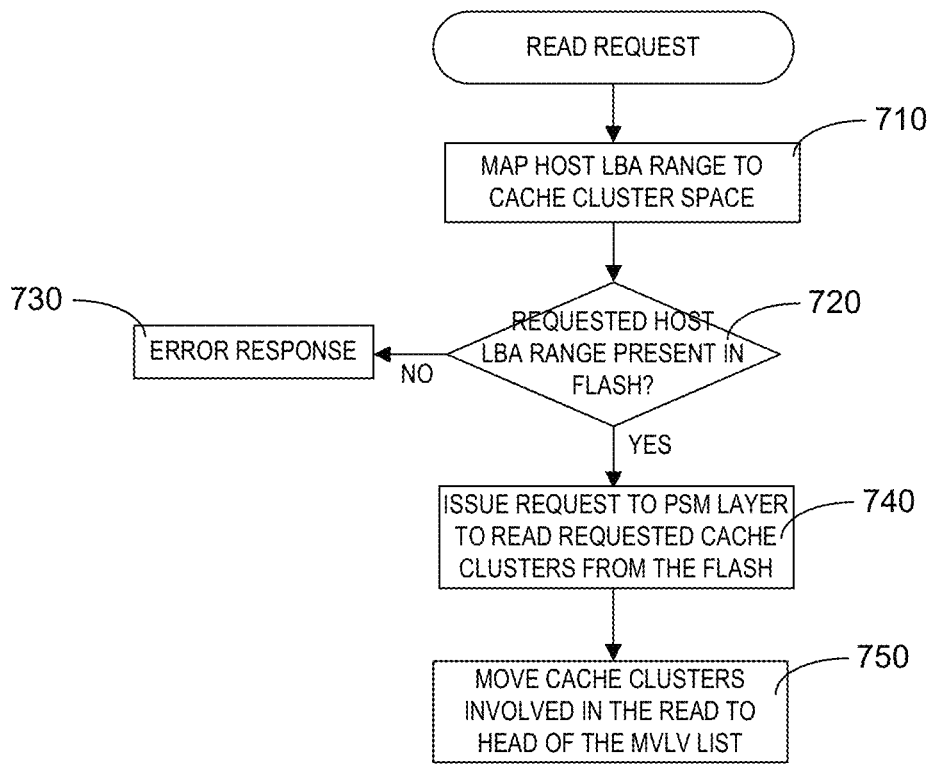
FIG. 7 is a flow diagram that conceptually illustrates implementation of a read request by the hybrid controller.

FIG. 7 is a flow diagram that conceptually illustrates a read request issued by the FCI layer to the FCTM layer. The FCI layer can request a read for any host LBA range, the requested host LBA range need not be cluster aligned. The FCTM layer maps the host LBA range of the read request to the cache address space and determines 720 if the host LBA range of the read request is present in the cache. If the host LBA range is not present in the cache, an error response is generated 730 and is returned to the FCI layer. If the host LBA range of the read request is present in the flash, the FCTM creates a list of cache clusters involved in the read request and issues 740 requests to the PSM interface to read the requested cache clusters (which have been mapped from the host LBAs in the read request). The cache clusters read from the flash are transferred to the FCI layer. The cache clusters involved in the read request are made most valuable and are moved 750 to the head of the MVLV list.

Embodiments described herein involve processes implemented by the FCTM layer to manage memory access requests received from the FCI layer, translated through the FCTM layer and sent to the PSM layer. The memory access requests may involve reading the flash memory, writing to the flash memory, and so forth. In various embodiments, management and implementation of the memory access requests is accomplished in the FCTM layer using a set of incoming queues and a set of outgoing queues.

Figure 8:
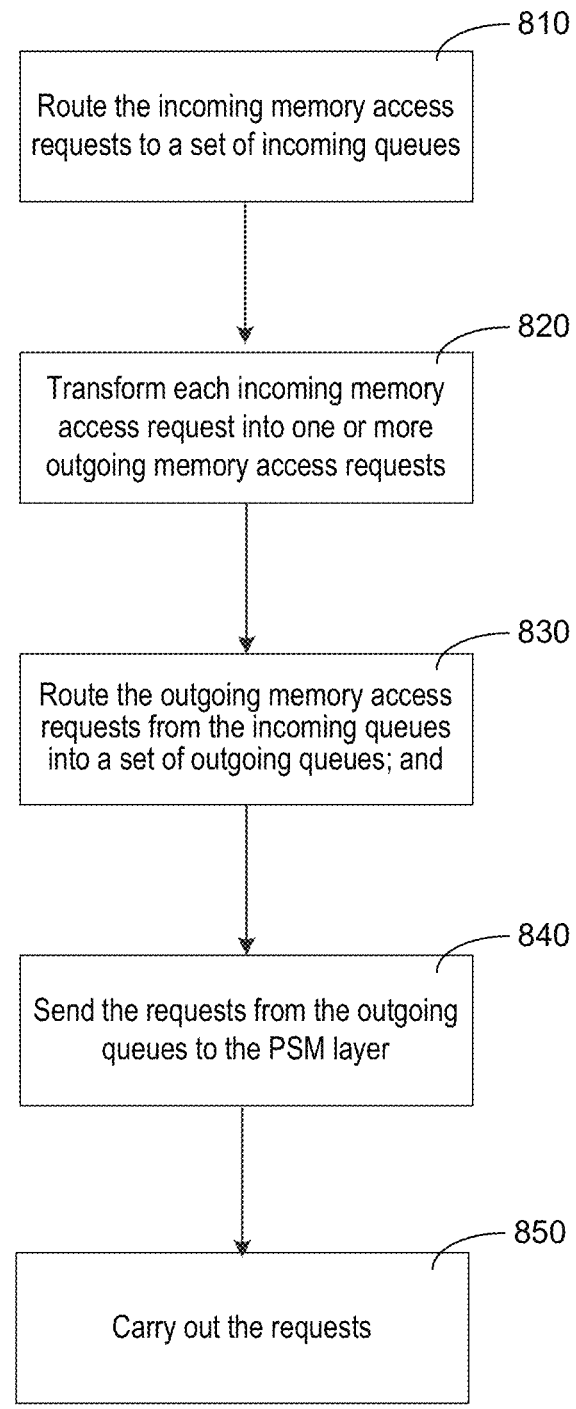
FIG. 8 is flow diagram illustrating a process of managing memory access requests in accordance with some embodiments.

FIG. 8 is a flow diagram that illustrates a process of managing memory access requests in the FCTM layer. Memory access requests are received by the FCTM layer from the FCI layer and PSM interface requests are sent to the PSM layer by the FCTM layer. Memory access requests (sometimes referred to herein as incoming memory access requests, or as incoming requests because these requests are incoming from the perspective of the FCTM layer) are received by the FCTM layer from the FCI layer. The incoming requests are routed 810 into a set of incoming queues. The memory access requests queued in the incoming queues are transformed 820 into outgoing memory access requests. The outgoing requests are routed 830 to a set of outgoing queues. The outgoing requests in the outgoing queues are sent 840 to the PSM layer which carries out 850 the requests to perform the operations specified in the requests.

Figure 9A:
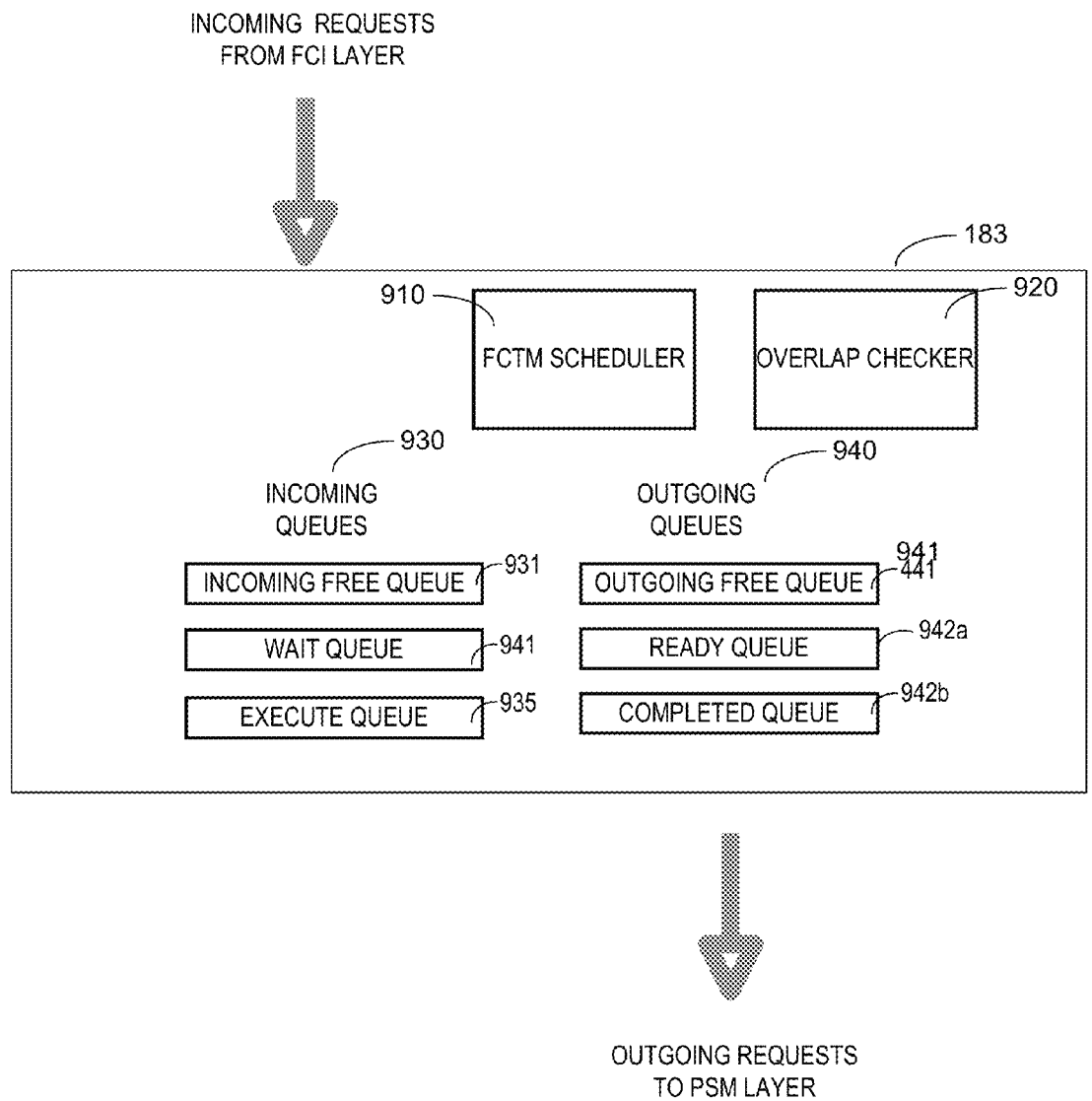
FIG. 9A illustrates the organization of various components of the a hybrid controller in accordance with some embodiments.
Figure 9B:
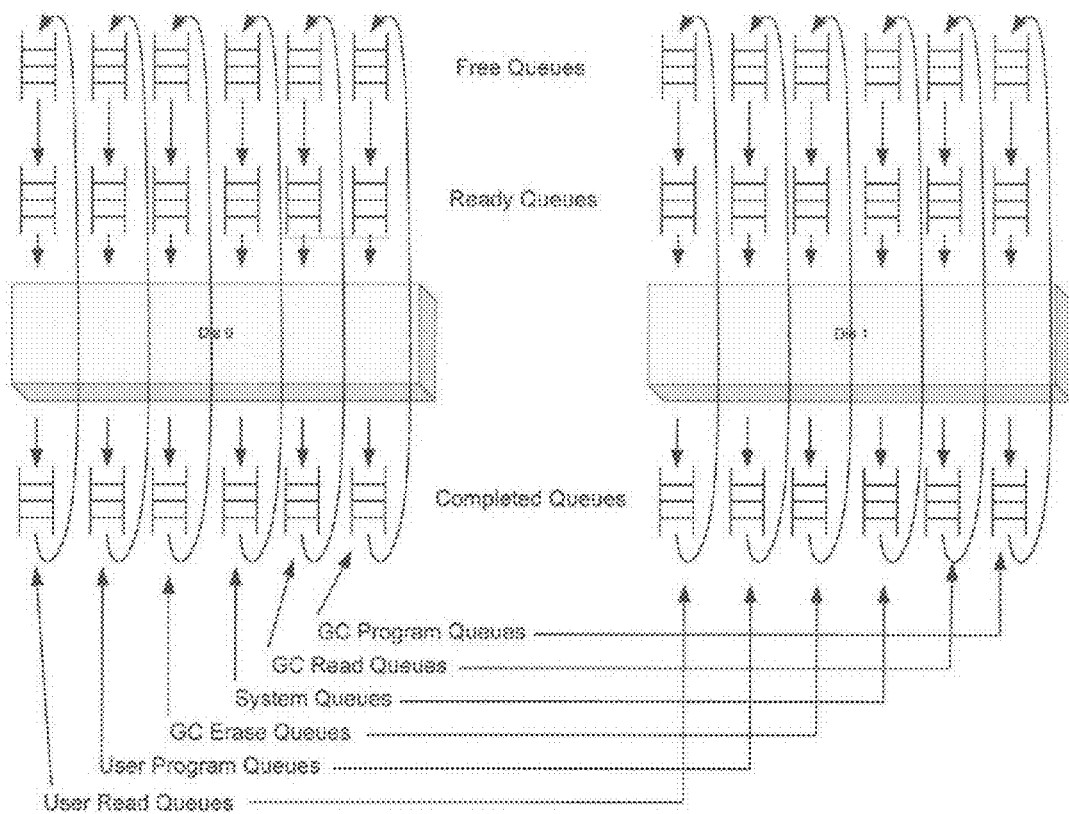
FIG. 9B diagrammatically illustrates the flow of memory access requests in various queues of the hybrid controller in accordance with various embodiments.

FIG. 9A illustrates the organization of various components of the FCTM layer 183, and FIG. 9B diagrammatically illustrates the flow of memory access requests/PSM interface requests among the queues. As depicted in FIG. 9A, the FCTM layer 183 includes a FCTM scheduler 910 which is responsible for various scheduling operations of the FCTM layer 183 such as routing incoming memory access requests and/or outgoing requests among the various queues 930-942 of the FCTM layer 183. The FCTM layer 183 also includes an overlap checker 920 configured to determine if there is an overlap between the memory access requests. An overlap may occur if there is an overlap in the host LBA ranges of two memory access requests.

The overall structure of the incoming queues 930 and the outgoing queues 940 is illustrated in FIG. 9A. The incoming queues 930 include an incoming free queue 931, a wait queue 930, and an execute queue 935. The incoming free queue 931 includes nodes which are used to control the flow of memory access requests into the execute queue 935. Generally, the FCTM scheduler 910 routes incoming memory access requests from the FCI layer into the wait queue 932 only if a node is available in the incoming free queue 931. The number of nodes in the incoming free queue 931 represent the capacity of the FCTM layer 183 at any particular time to process incoming memory access requests.

If a node is available in the incoming free queue 931, that node becomes "occupied" by an incoming memory access request when the memory access request is routed 951 into the wait queue 932. When a node is occupied by a memory access request, information about the memory access request is stored in the node. For example, the node may store information about the type of memory access request, the host LBAs involved in the memory access request, information about the progress of the memory access request, such as how much data has been transferred in conjunction with the memory access request, how much work to complete the memory access request is pending and so forth. If a node is not available in the incoming free queue 931, then the FCTM layer does not have the capacity to process the incoming memory access request and an error message is generated.

In some cases, when a particular memory access request in the execute queue 935 is transformed into a number of PSM interface requests. Each of the PSM interface requests represents outstanding work to the PSM layer. As nodes become available in the outgoing free queue 941 to execute a memory access request in the execute queue 935, those available outgoing nodes become "occupied" by the PSM interface requests associated with the memory access request which is being executed. The PSM interface requests associated with the memory access request being executed are transferred to an outgoing ready queue 942a. The memory access request being executed may remain in the ready queue 942a (occupying a node from the incoming free queue) until execution of the memory access request by the FCTM layer is complete. Execution of a memory access request in the FCTM layer may be deemed to be complete when the responsibility for processing the memory access request is transferred from the FCTM layer to the PSM layer. This occurs after all the PSM interface requests associated with a memory access request are issued to the PSM layer. For example, responsibility may be transferred when the last PSM interface request associated with a memory access request is successfully transferred to the PSM layer or when the last PSM interface request associated with the memory access request has been successfully completed by the PSM layer and acknowledgement of the successful completion of the PSM interface request has been received by the FCTM layer and the PSM request is places in the completed queue 942*b*.

When execution of a memory access request is complete, the node from the incoming free queue that was previously occupied by the incoming memory access request in the execute queue 935 is returned to the incoming free queue 931. The previously occupied node becomes available again for being occupied by subsequent memory access requests. Each of the nodes in the PSM execute queue associated with the memory access request being executed are returned to the outgoing free queue 941 as the PSM interface requests occupying these nodes are completed. The previously occupied PSM nodes become available again to be occupied by subsequent PSM interface requests. In some cases, an error occurs when one or more PSM interface requests are transferred to the PSM layer. When an error occurs in the processing of PSM interface requests associated with a memory access request, the node used to process the incoming memory access request may be returned to the incoming free queue, and the PSM nodes used to process the outgoing PSM interface requests may be returned to the outgoing free queue. In other words, the processing of the incoming memory access request is cancelled and not completed when an error occurs.

In some implementations, incoming memory access requests from the FCI layer to the FCTM layer is restricted meaning that during a time that the FCTM layer is processing a memory access request then the FCI layer is barred from issuing another memory access request to the FCTM layer. Implementations that restrict additional incoming memory access requests from the FCI layer protects the FCTM layer from excessive combinations of possible events affecting the FCTM layer and enhances the thread safety of the layer. In some implementations the code, e.g., all of the code, that manages the queues is executed on a single thread and none of the data structures of the FCTM layer, e.g., the queues can be used are manipulated by external entities, e.g., other layers of the hybrid controller.

The FCTM layer can process a number of types of memory access requests received from the FCI layer. FIG. 9A illustrates the process for three types of memory access requests—read requests, promotion requests, and invalidate requests that can come from the FCI layer to the FCTM layer. As explained in more detail herein, read requests are requests from the FCI layer to read host LBAs from the flash, promotion requests are requests from the FCI layer to promote (write) host LBAs into the flash, and invalidate requests are requests from the FCI layer to mark certain host LBAs in the flash as invalid (not containing valid data).

FIG. 9B illustrates the different types of PSM outgoing queues in an exemplary two die system. According to various implementations, a set of queues are maintained per physical flash, the physical flash being capable of processing one request at any given time. Each die can process requests independently of other die in the system. A priority scheme may be used for transferring the incoming and/or outgoing memory access requests between queues. In some cases, the priority scheme may be multi-tiered, wherein a first level of priority is implemented by the FCTM scheduler to select incoming memory access requests from the ready queue and a second level of priority is implemented by the FCTM scheduler when assigning PSM nodes from the outgoing free queue. Requests from FCTM to the PSM may be prioritized in the following order, for example, user read, user write, garbage collection (GC) erase, system area, GC read, and GC write. FIG. 4B shows the exemplary six types of requests from the FCTM to the PSM in six different queues (user read queue, user program queue, garbage collection (GC) erase queue, system queue, GC read queue, GC program queue) for each die in the system. Each of the request queues also has a respective free queue, ready queue, and completed queue.

According to various implementations, user reads have a higher priority than any of the other types of requests and system area requests have the lowest priority. According to some aspects, user reads get the highest priority since the host is waiting for the request to complete. According to some priority schemes, requests that require the least resources and/or are faster to execute may be selected for execution before requests that require more resources and/or are slower to execute. For example, invalidate requests may be selected for execution before read or promotion requests because invalidate requests are the faster to execute. Some priority schemes use a combination of factors when determining the priority level of a request. For example, in a system in which shorter requests are generally executed first, GC erases may still be implemented before GC reads and/or writes even though the erase requests take longer to complete. Choosing GC erases as having a higher priority may be done to free up additional resources. According to various aspects, system area requests do not have the lowest priority to reduce the likelihood that resources are depleted during busy times. In some cases, the garbage collection requests and the system area requests are completed when there are no pending user requests.

Figure 10:
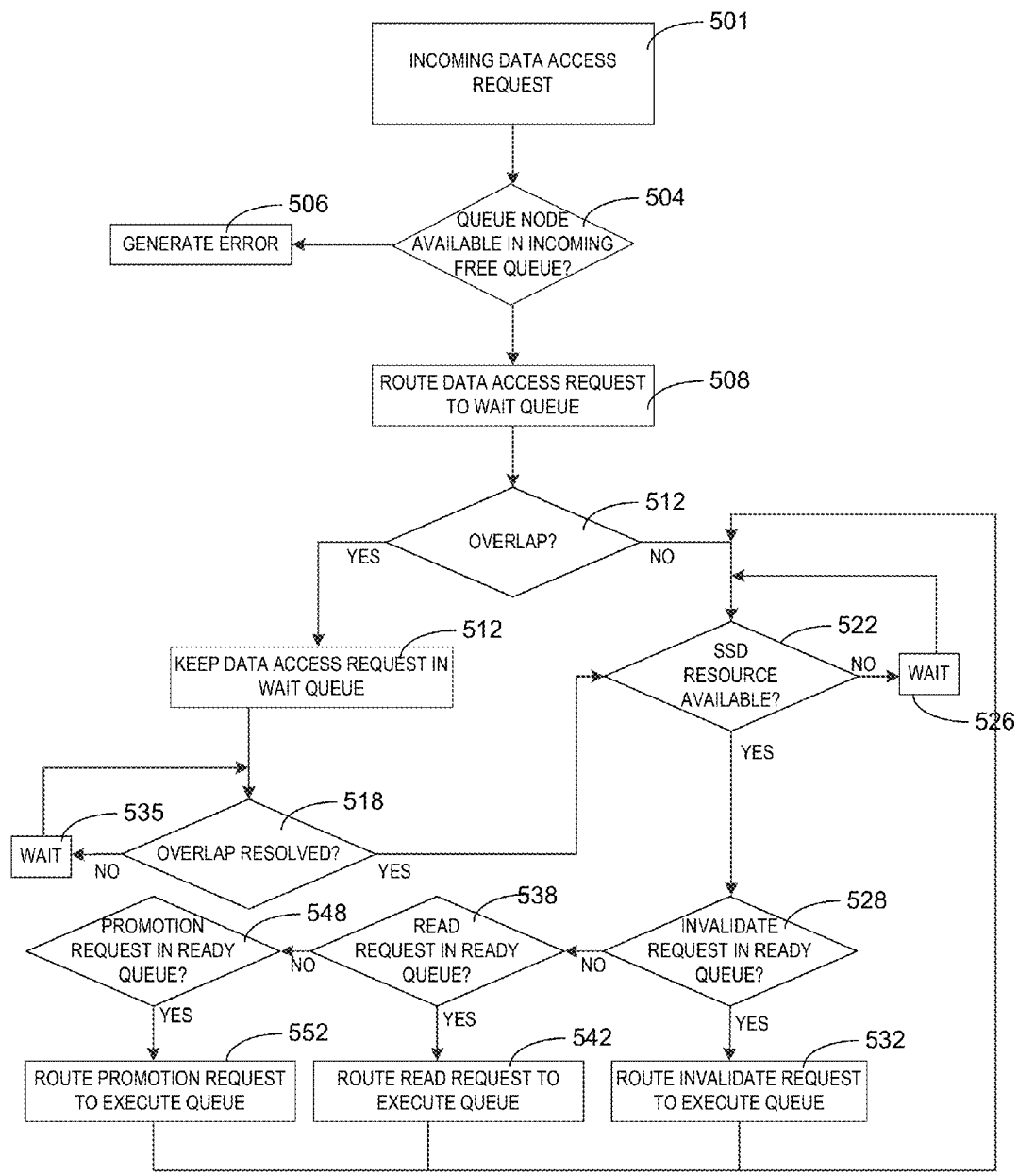
FIG. 10 is a flow diagram that illustrates a priority scheme that may be implemented to route memory access requests according to some embodiments.

The flow diagram of FIG. 10 conceptually illustrates an overview of one priority scheme that may be implemented by the FCTM scheduler for routing memory access requests from the ready queues to the execute queue. As previously discussed, for each incoming memory access request 501, the FCTM scheduler routes the memory access request to the wait queue 508 if there is a node available in the incoming free queue 504. If there are no nodes available 504 in the incoming free queue, the FCTM scheduler generates 506 an error response which is sent to the FCI layer.

The FCTM overlap checker determines 512 if the address range (host LBA range) of the memory access request that is routed to the receive queue overlaps with the address range of other memory access requests. If an overlap is not detected 512, it is determined 522 whether resources are available to execute the request. If an overlap is detected 512, the memory access request is kept 514 in the wait queue. Data access requests routed to the wait queue due to an overlap wait there until the overlap is resolved. If the overlap is resolved 518, it is determined 522 whether there are resources available to complete the request.

Data access requests wait 526 in the wait queue until at least one PSM node in the outgoing free queue is available for execution of the memory access request. Once an PSM node is available, the priority scheme for routing memory access requests to the execute queue is implemented. If there is 528 an invalidate request in the ready queue, the invalidate request is routed to the execute queue 532 and the process returns to the implementation of the priority scheme at step 522. According to the priority scheme, if multiple invalidate requests are present in the invalidate ready queue, these invalidate requests would be processed until the invalidate ready queue is empty. If the invalidate ready queue is empty and there is 538 a read request in the read ready queue, the read request is routed 542 to the execute queue and the process returns to the implementation of the priority scheme at step 522. If there are 528, 538 no invalidate requests or read requests in their respective ready queues and there is 548 a promotion request in the promotion ready queue, the promotion request is routed 552 to the execute queue and the process returns to the implementation of the priority scheme at step 522.

In some scenarios, a priority scheme may be pre-emptive—involving pre-empting requests in the execute queue with requests in the ready queue. In some implementations such a pre-emption takes place if the request in the ready queue would take less time/resources for execution than the request in the execute queue. In one example, invalidate requests in the ready queue preempt promotion requests in the execute queue. Execution of the invalidate requests may cause a delay in the completion of the execution of the promotion request, however, this delay may be minimal because the invalidate requests can be executed very quickly if there is no I/O to the flash.

Figure 11A:
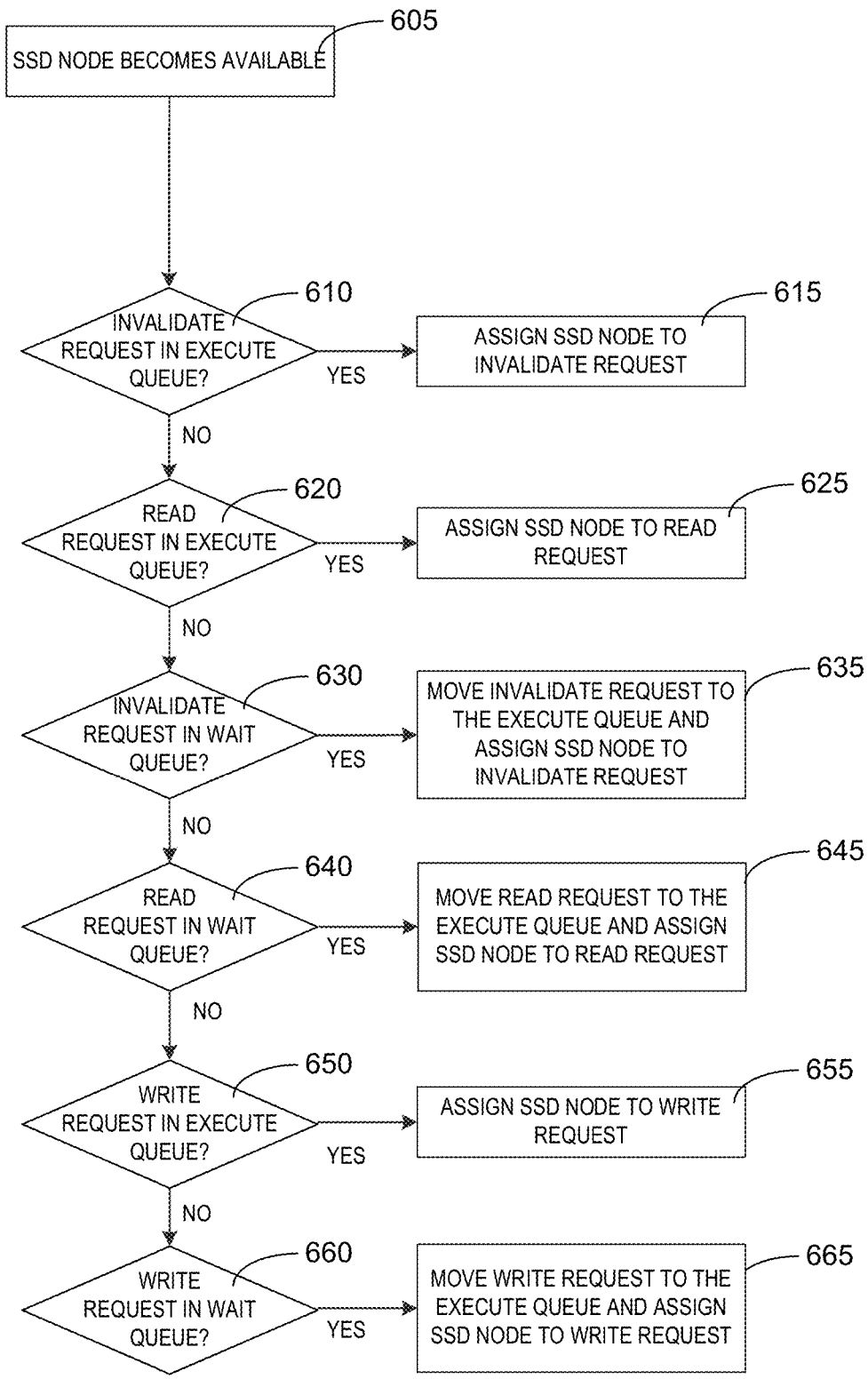
FIGS. 11A and 11B are flow diagrams that illustrate various priority schemes for managing memory access requests in accordance with various embodiments.

One possible implementation of a pre-emptive priority scheme is conceptually illustrated by the flow diagram of FIG. 11A. Such a priority scheme may be implemented alone or as a second level of priority in conjunction with another priority scheme, e.g., the priority scheme discussed in connection with FIG. 10. After the work associated with a PSM interface request occupying a PSM node is completed, the PSM node is returned to the outgoing free queue and becomes available 605 again. A priority scheme is implemented that determines the memory access request to which this available PSM node is next assigned. According to the priority scheme of FIG. 11A, if 610 there is an invalidate request in the execute queue, the PSM node is assigned 615 to the invalidate request. If 620 there is a read request in the execute queue, the PSM node is assigned 625 to the read request. If 630 there is an invalidate request in the ready queue, the invalidate request is moved to the execute queue and the PSM node is assigned 635 to the invalidate request. If 640 there is a read request in the wait queue, the read request is moved to the execute queue and the PSM node is assigned 645 to the read request. If 650 there is a promotion request in the execute queue, the PSM node is assigned 655 to the promotion request. If 660 there is a promotion request in the wait queue, the promotion request is moved to the execute queue and the PSM node is assigned 635 to the promotion request. The priority scheme illustrated in FIG. 10 provides for an optimal ordering in the execution of requests to achieve minimal host request latency.

Note that the priority scheme illustrated in FIG. 11A may mean that a request in the execute queue may be pre-empted by a request for which execution has not yet started. The preempting request may be in the ready queue and, if so, the pre-empting request would be moved to the execute queue and the available PSM node would be assigned to it. Thus, the pre-empting request may delay the execution of a request in the execute queue that is currently being executed.

Figure 11B:
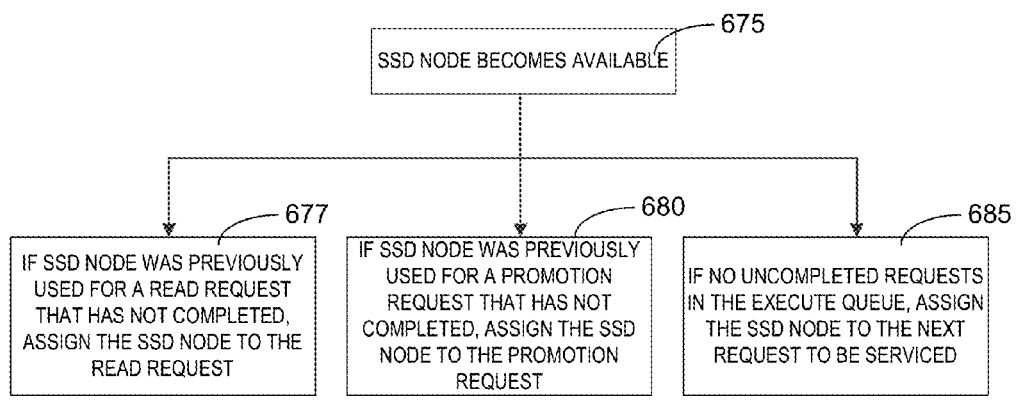

FIG. 11B illustrates another priority scheme that may be used to select requests for assigning available PSM nodes. The priority scheme illustrated in FIG. 11B may be used as a second level priority scheme in conjunction with the priority scheme of FIG. 10. As previously discussed, the PSM nodes are used for PSM interface requests that implement an incoming memory access request. More than one PSM interface request may be needed for a single memory access request in the execute queue. If an PSM interface request occupying an PSM node completes, the node becomes available 675 to service another PSM interface request. According to the priority scheme of FIG. 11B, the PSM nodes that become available and have been used to service PSM interface requests for a particular memory access request in the incoming execute queue would be used to service the next PSM interface requests for the same memory access request in the execute queue until that memory access request is complete. For example, if the PSM node that has become available was previously used by an PSM interface request generated in conjunction with a read request in the incoming execute queue that has not yet completed, then the PSM node is assigned 677 to the next PSM interface request that services the read request in the execute queue. If the PSM node that has become available was previously used by an PSM interface request generated in conjunction with a promotion request in the execute queue that has not yet completed, then the PSM node is assigned 680 to the next PSM interface request that services the promotion request in the execute queue. If the PSM node was used in conjunction with a memory access request that has completed, the PSM node is assigned to an PSM interface request associated with the next memory access request to be serviced.

Figure 12A:
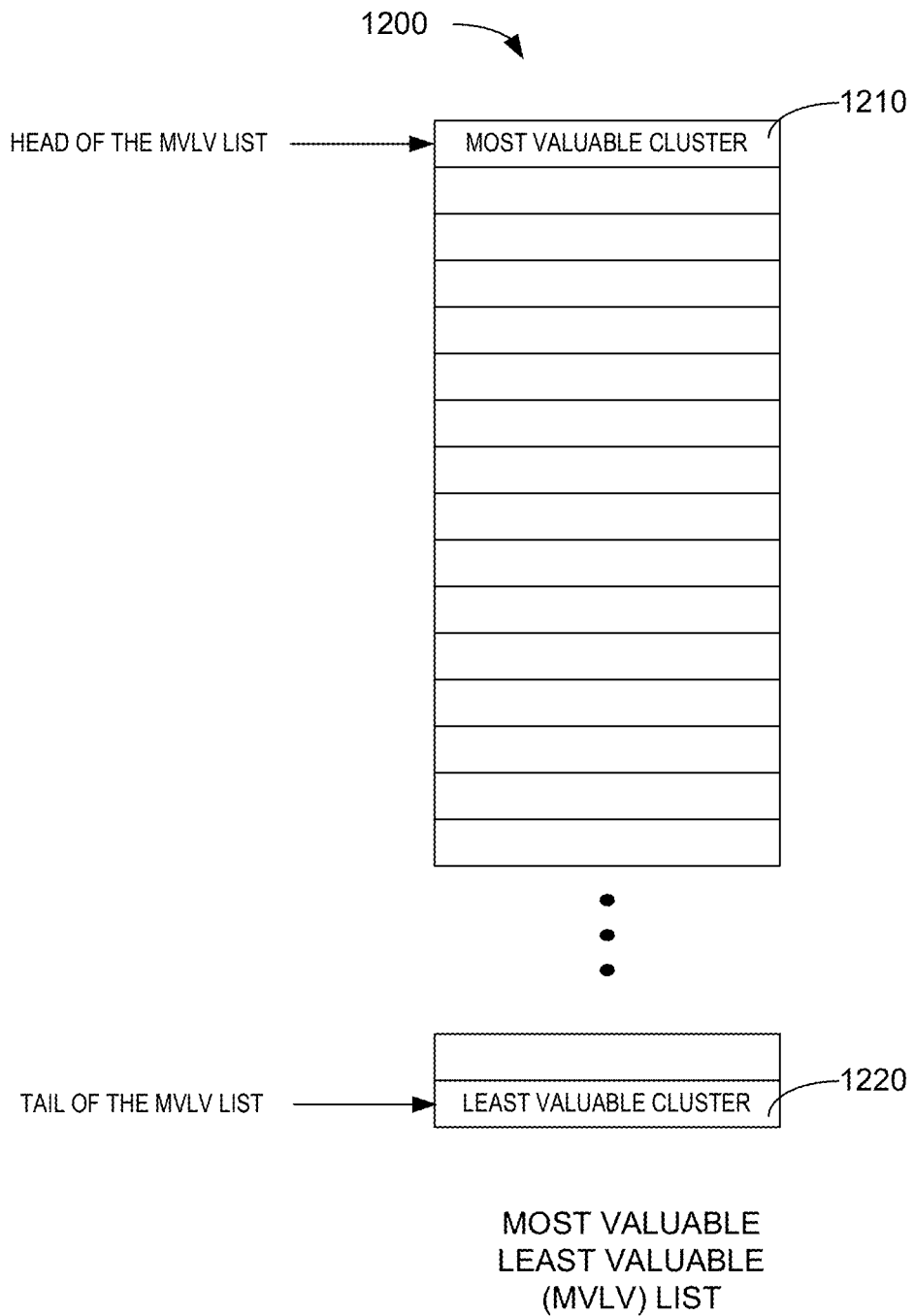
FIG. 12A illustrates a most valuable least valuable list that may be maintained by the hybrid controller of some embodiments.

In some scenarios, the flash memory may be full when a promotion request is executed. If so, the FCTM may cause some data stored in flash to be evicted. To implement evictions, as illustrated in FIG. 12A, the FCTM layer maintains a most valuable least valuable (MVLV) list of clusters 1200 which ranks the value of the clusters according to some criteria, which may be based on one or a number of factors such as which of the clusters was most/least recently used and/or which of the clusters is most frequently/least frequently used, for example. One end of the MVLV list 1210 is referred to herein as the head, which is the position of the currently most valuable cluster, and the opposite end 1220 of the MVLV is referred to as the tail, which is the position of the currently least valuable cluster. If the flash memory is full and a promotion request is executed, the cluster at the tail 1220 of the MVLV list is selected for eviction. In some implementations, when a cluster is read or written, that cluster becomes the most valuable cluster, because it was most recently used, and is moved to the head of the MVLV list 1210.

The FCTM layer maintains list, e.g., linked list, of free clusters in the flash (denoted the free list) and/or maintains a list, e.g., linked list, of in-use flash clusters (denoted the use list). The free list includes flash clusters that are available for use. The free list may include GCUs that are not yet erased and are ready for new data. A defect list may include clusters that are defective. A ready list comprises erased clusters that have not been programmed. A GC ready list includes clusters that are ready for garbage collection. The GC ready list may be used to differentiate between user programs and garbage collection programs due to user data having a higher priority than garbage collection programs. The FCTM may also include a reserved chain that is used to track clusters that are not to be used for user data. The reserved state may be used to prevent use of reserved areas of the flash such as system areas. In some cases one or more flash clusters may be in a detached state during which the flash clusters are not in either the free state, the defect state, the ready state, the GC ready state, or the reserved state. An flash cluster may be in a detached state, for example, during the time that the clusters are involved in execution of a request, e.g., during the time that data is written to the clusters.

Figure 12B:
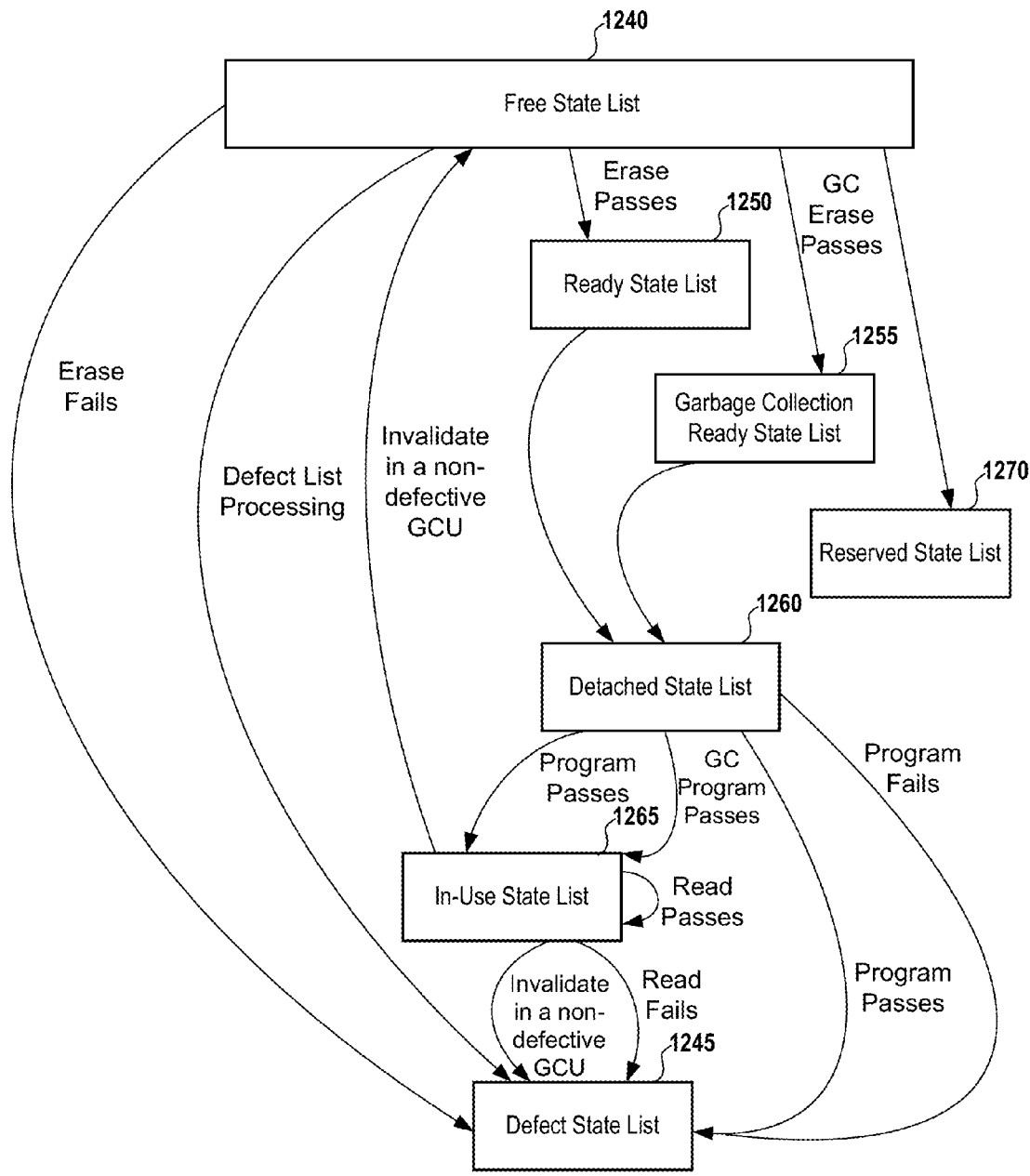
FIG. 12B illustrates transitions between the various chains in accordance with various implementations.

FIG. 12B illustrates transitions of flash clusters between the various states. The clusters in any state are represented as a double linked list of clusters. An erase attempt is made to clusters that are in the free state list 1240. If the erase fails, the clusters are moved into the defect state list 1245. The clusters that are in the free state list 1240 may also be moved into the defect state list 1245 due to a defect list processing process. If the erase passes, the clusters are moved into the ready state list 1250. If a garbage collection erase passes, the clusters are moved into the garbage collection ready state list 1255.

If the clusters in the ready state list 1250 or the clusters in the garbage collection ready state list 1255 are selected for programming, the clusters are moved into the detached state list 1260. A program is attempted on the clusters in the detached state list 1260. If the program fails or and/or a garbage collection program fails, the clusters are moved into the defect state list 1245. If the program passes and/or a garbage collection program passes the clusters are moved to an in-use state list 1265.

A read is attempted on the clusters in the in-use state list 1265. If the read passes, the clusters remain in the in-use state list 1265. If the read fails, the clusters are moved into the defect state list 1245. The in-use clusters may also be invalidated in a defective GCU and are moved into the defect state list 1245. According to various embodiments, clusters in the free state list 1240 may also be moved to the reserved state list 1270 for clusters that are not meant for normal use. In some cases, the clusters in the reserved state list 1270 can be used to destroke the flash part. Destroking the flash can be used to reduce the user available capacity of the flash memory to provide more space for system functions as the device ages, for example.

If the flash memory is not saturated, i.e., there is a sufficient free space in the flash for promotion without evictions being performed, non-overlapping requests from the FCI layer can execute in any order. For an unsaturated flash, only overlapped requests are placed in the overlap queue. If the flash is saturated, evictions must take place in order to make room for promotion requests to be implemented.

Figure 13:
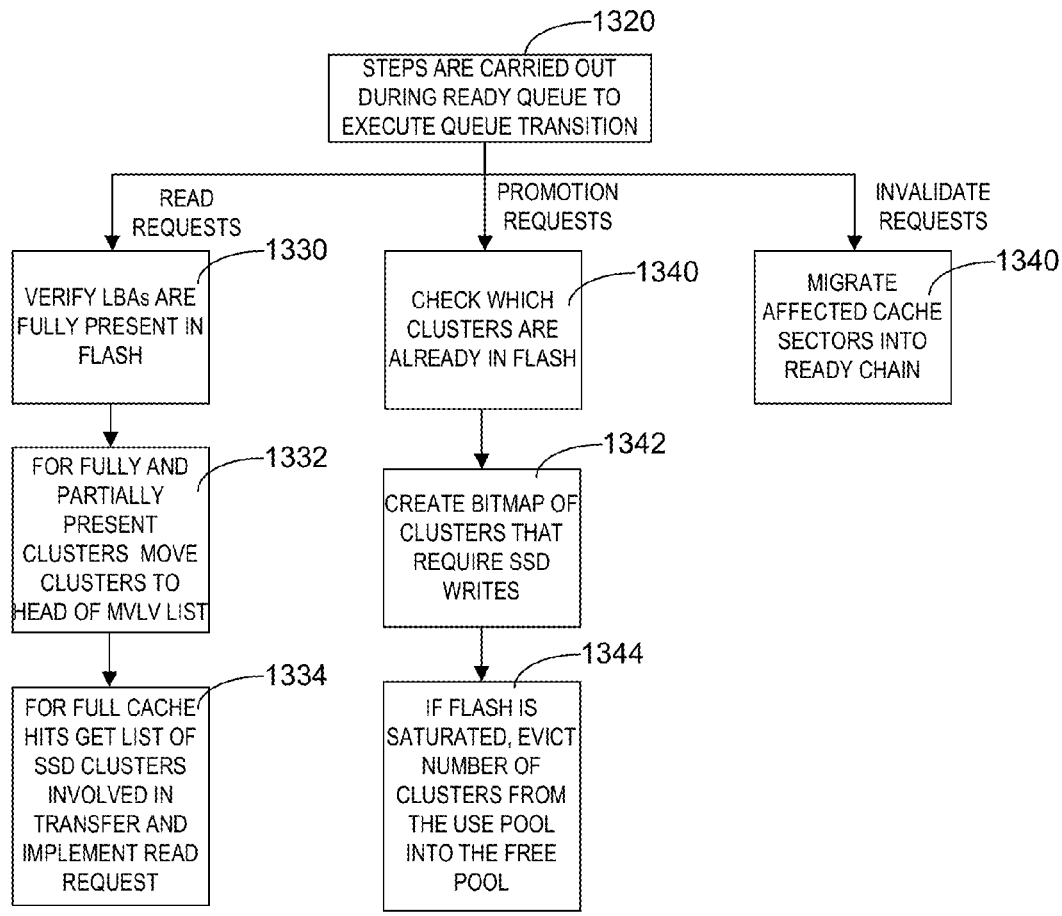
FIG. 13 illustrates processes that are carried out for various memory access requests during the ready queue to execute queue transition according to various embodiments.

As illustrated in FIG. 13, certain steps 1320 are carried out during the ready queue to execute transition for read, promotion, and invalidate requests. These steps may be implemented as atomic operations that are completed without interruption. Performing these steps atomically (without interruption) ensures that no other requests remove these flash clusters from the flash address space before the request has executed. For example, if an invalidate request is received while a read request is executing, the invalidate request will move to the overlap queue so that the invalidate request does not interfere with the execution of the read request. If the invalidate request were serviced during execution of the read request, there is a possibility that the invalidate request would invalidate some LBAs involved in the read request.

For read requests, during the ready queue to execute queue transition, the FCTM scheduler verifies if the LBA range in specified in the request is 1330 fully present in the flash. If the range is not fully present, the read request is not executed and an error response is generated. The flash clusters that correspond to the host LBA range of the read request (whether or not fully present) are made most valuable by moving 1332 these clusters to the head of the MVLV list. If the flash clusters that correspond to the host LBA range of the read request are fully present in the flash, the FCTM scheduler creates 1334 a list the flash clusters and implements the read request.

For promotion requests, during the ready queue to execute queue transition, the FCTM scheduler checks 1340 to determine which flash clusters are already present in the flash and creates 1342 a bitmap of the overlapped flash clusters already present in the flash. The bitmap is used to skip writing the overlapped clusters to the flash. If the flash is saturated, the required number of clusters may be evicted 1344 to make room for the new clusters to be written as part of the promotion request.

For invalidate requests implemented, during the ready queue to execute queue transition, the FCTM scheduler migrates 1350 the flash clusters being invalidated into the free list of flash clusters.

Flash memory cells must be erased by applying a relatively high voltage to the cells before being written, or "programmed." For a number of reasons, these erasures are often performed on blocks of data (also referred to herein as "erase units" or "erasure blocks"). An erase unit may include any physical or logical blocks of memory that are treated as a single unit for purposes of erasure. In many implementations, erase units are contiguous physical units that are larger than the data storage units (e.g., pages) that may be individually read or programmed. In such a case, when data of an existing page needs to be changed, it may be inefficient to erase and rewrite the entire block in which the page resides, because other data within the block may not have changed. Instead, it may be more efficient to write the changes to empty pages in a new physical location, remap the logical to physical mapping for the altered blocks via the controller logic, and mark the old physical locations as invalid/stale.

After some time, numerous data storage units within a memory unit may be marked as stale due to changes in data stored within the block. As a result, it may make sense to move any valid data out of the block to a new location, erase the block, and thereby make the block freshly available for programming. This process of tracking invalid/stale data units, moving of valid data units from an old block to a new block, and erasing the old block is sometimes collectively referred to as "garbage collection." Garbage collection may be triggered by any number of events. For example, metrics (e.g., a count of stale units within a block) may be examined at regular intervals and garbage collection may be performed for any blocks for which the metrics exceed some threshold. Garbage collection may also be triggered in response to other events, such as read/writes, host requests, current inactivity state, device power up/down, explicit user request, device initialization/re-initialization, etc. In some cases, garbage collection is triggered when the last outstanding user (FCI) command completes and there are no other outstanding commands, for example Garbage collection is performed on garbage collection units (GCUs), which generally refer to physical units that are garbage collected and erased as a contiguous unit. In some flash memory implementations, the smallest size of a GCU is one erasure block. It may be possible in some implementations for a garbage collection unit to include multiple erasure blocks, and other variations between GCU size and erase unit size are also possible. For the purposes of the following discussion, the GCU may be of a predetermined size, but need not have any direct correspondence to the size of erasure units upon which garbage collection is performed.

As described above, in some storage systems that use flash based memory there is an erase before each program of a GCU. This erase process must first ensure that any valid data currently residing in that GCU is moved to another location. This process of moving the valid data and erasing the GCU may be part of a garbage collection operation. In order to find the optimal candidate for garbage collection, garbage collection metrics are maintained for the GCUs. One often-used garbage collection metric is a staleness count, which reflects the number of stale logical block addresses (LBAs) residing in a particular GCU. In some cases, a table is maintained to track the staleness of all GCUs. Additionally or alternatively, a binary max heap may be created with staleness as the comparison function. A binary heap is a tree. The root node of the heap may be the GCU with the maximum staleness. The root node is selected as the candidate GCU. Other characteristics may also be considered when forming a garbage collection metric.

In some cases, a GCU is made up of one or more clusters. For example, each GCU may contain 128 or 256 clusters. As described above, staleness of a GCU is defined as the number of clusters in a GCU that no longer contain valid data. Clusters may become invalid as a result of invalidations from the FCI layer or as a result of evictions. Evictions can be used to maintain a predetermined amount of over provisioning, for example. Garbage collection of a GCU involves cluster migration and erase of the GCU.

Figure 14:
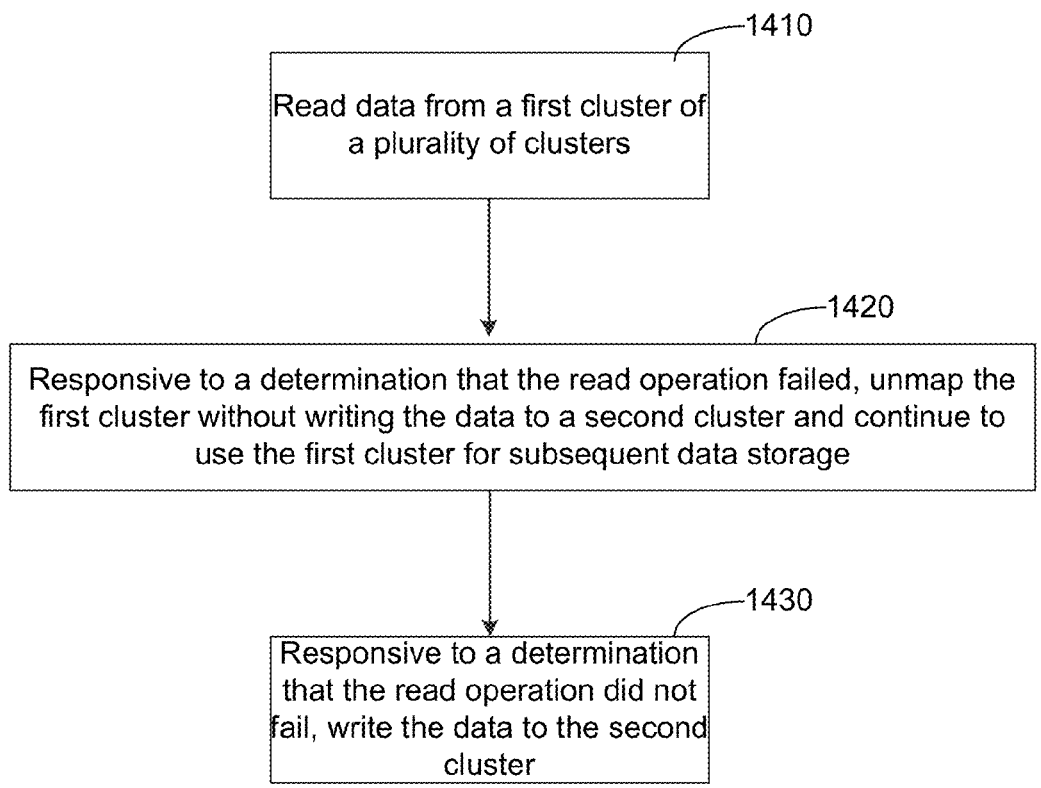
FIG. 14 is a flow diagram that illustrates a method for garbage collection in a hybrid system according to some embodiments.

FIG. 14 is a flow diagram that illustrates a method for garbage collection in a hybrid system according to some embodiments. In this example, the GCUs are made up of several data clusters. Consider the scenario where a first plurality of clusters of a first GCU are being garbage collected to a second plurality of clusters of a second GCU. Data is read 1410 from a cluster of the first plurality of clusters of the first GCU. Responsive to a determination that the read operation failed, the cluster is unmapped 1420 without writing the data of the cluster to a cluster of the second GCU. The cluster that experienced the read operation failure continues to be used for subsequent data storage. In a system that does not have a cache, the cluster that experienced the read operation failure may be defected (placed on a list of clusters that are not used because of defects) if a read operation fails. This is because in a system without a cache, there is no redundant copy of the data, thus clusters that have experienced one or a small number of read failures are defected so that the storage is robust. According to various aspects of the present disclosure, the hybrid system continues to use a cluster even if a read fails. In the hybrid configurations disclosed herein there may be less concern for losing the data in the cache because a second redundant copy of the data is stored on the primary memory, i.e., the magnetic disk. Responsive to a determination that the read operation did not fail, data from the cluster is written 1430 to cluster of the second GCU.

Figure 15:
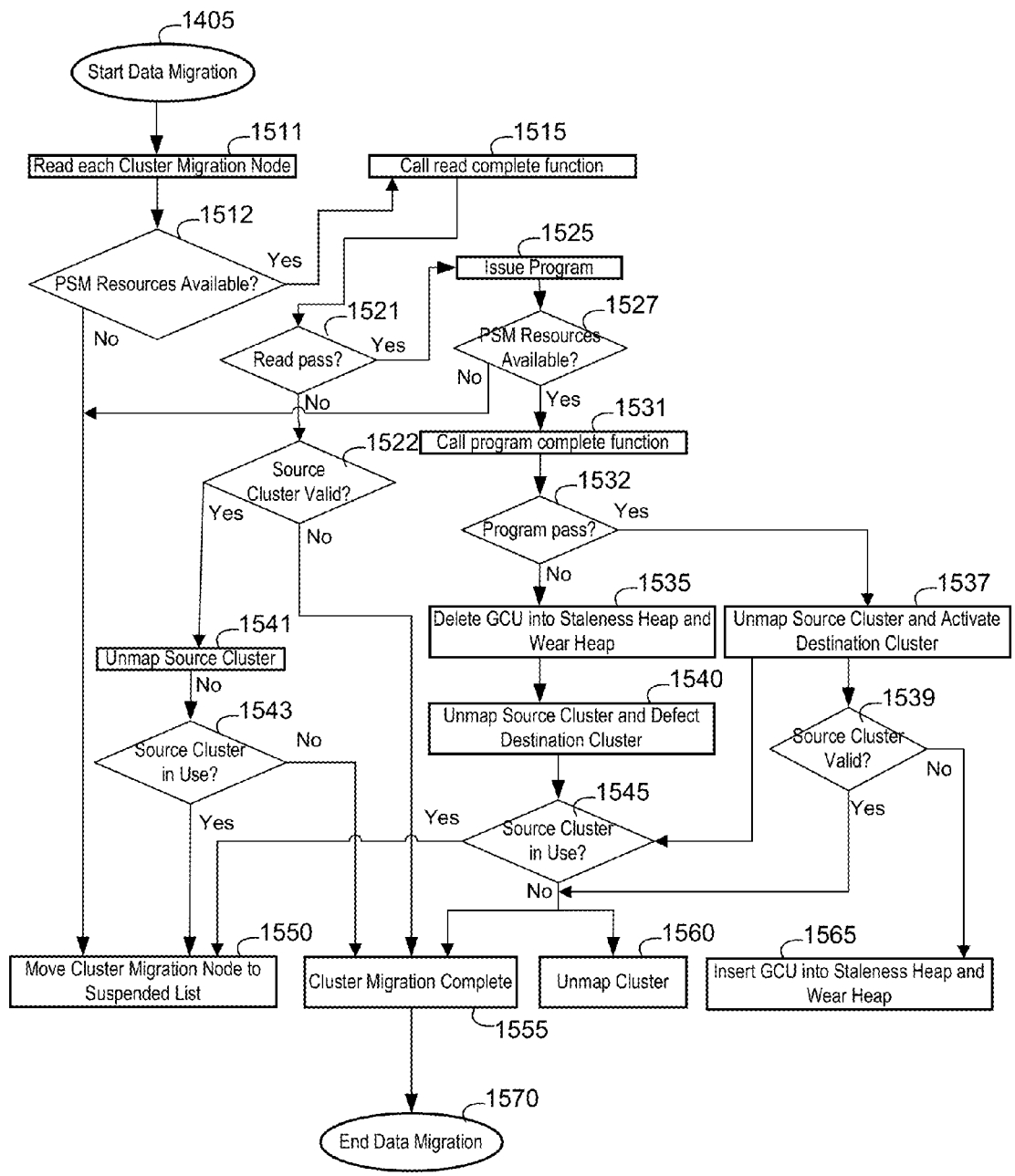
FIG. 15 illustrates a process for cluster migration in accordance with various aspects.

As described previously, a garbage collection process involves the movement of data from a first GCU that is undergoing garbage collection (where garbage collected data is being collected from) to a second GCU where the data from the first GCU is being collected (where the garbage collected data is being collected to). This movement of data may involve a cluster migration process. FIG. 15 illustrates a process for cluster migration. The process of migrating clusters for a GCU is accounted for using a cluster migration node. For each valid cluster in the GCU, a read cluster operation is performed 1511 and the data is read into a holding region. To enable faster garbage collection operations, multiple concurrent cluster migrations may be supported, e.g., across multiple planes and/or across multiple die of the cache. According to various implementations, the holding region is as large as the maximum number of concurrent cluster migrations supported. For example, in a four die system, the maximum number of cluster migrations supported may be eight. The system checks 1512 if there are enough resources in the PSM layer to implement the read operation. If there are not enough resources, the read operation is suspended 1550 until there are enough PSM resources to complete the read operation. A suspend list is used to track clusters waiting for PSM resources and to track clusters waiting for an unmap operation due to the cluster being in use. A separate bitmap may be maintained for cluster in use by a host read command. At the end of the host read, if this list is non-empty and the cluster in use has completed, the unmap is performed. If it is determined 1512 that there are enough PSM resources for a read, the system calls 1515 a function that indicates that the read is complete on the flash.

It is determined 1521 if the read of the flash was completed successfully. If the read fails 1521, the source cluster is unmapped and migration for this cluster ends. As described above, read failures do not cause a block to be defected because there is another copy of the data on the primary memory. If the read passes 1521, a program command is issued 1525 for the read data to be written to a fresh cluster that is selected from the garbage collection ready list. There may be more than one set of garbage collection ready lists for different types of data. For example, there may be one ready list set for user data and one ready list set for system data. Maintaining more than one ready list set may help to maintain a program order and/or to control overprovisioning of the memory unit.

The system determines 1527 if there are enough resources at the PSM layer to complete the program operation. If there are not enough resources, the program operation is suspended 1550 until there are enough resources to complete the program. If it is determined 227 that there are enough resources to complete the program operation, the program complete function is called 1531. It is determined 1532 if the program operation passes or fails. If the program operation passes 1532, the source cluster is unmapped and the destination cluster is activated 1537. If the source cluster is in use 1545 for an in progress flash cache hit, it cannot be unmapped and is sent to the suspend list and has to wait for the user read operation to complete.

According to various implementations, the FCTM layer includes an overlap checker configured to determine if there is an overlap between the memory access requests. An overlap may occur if there is an overlap in the host LBA ranges of two memory access requests. In some cases, an overlap checker may check for read operations that are rounded out to a cluster boundary since it is possible for requests to non-overlapping sectors within the same cluster to occur. Due to this, the source cluster may not be immediately unmapped.

It is determined 1539 if the source cluster is valid, i.e., contains valid data. If the source cluster is valid, the cluster is unmapped 1560 and the cluster migration is complete 1555. If the source cluster is not valid 1539, i.e., does not contain valid data, the GCU is inserted into the staleness heap and the wear heap. The staleness heap and the wear heap are data structures that are used to select GCUs for garbage collection according to staleness and wear leveling criteria. If the program fails, the GCU is deleted 1535 from the staleness heap and the wear heap, the cluster is unmapped 1560, and the cluster migration is complete 1555. The data migration process ends 1570.

After all valid data is migrated out of the candidate GCU, the GCU is erased and the clusters within the GCU are added to the ready list. If the GCU is defective (has had a program error previously) the clusters in the GCU are "defected" and moved to a defect list and the GCU is marked as being defective. If the erase operation fails, all clusters are moved to the defect list and the GCU is marked defective. The decision as to which ready list (user or system, for example) receives the erased clusters is based on the current length of each of the ready lists. A low water mark value and a high water mark value are defined for each of the ready lists. For example, the high water mark value may be 1 GB and a low water marker value may be 512 MB. According to various embodiments, the high water mark values and the low water mark values impact behavior such as overall system performance and may be tuned for different products and NAND flash parts from different vendors. If the system ready list is below the low water mark, the system ready list will receive the erased clusters. Once the system ready list is above the low water mark, the user ready list will receive the erased clusters. Garbage collection may continue until both lists are at least as long as their high water marks.

As described above, a read error may not result in defecting of a block because a redundant copy of data is stored in the primary memory. In some cases, a read error may be remedied in response to a block being programmed and used again. The chance of the read error being remedied depends on a number of factors such as the relaxation time, the number of program/erase cycles experienced by the memory unit, temperature, among others. Defecting a memory unit due to a read error may result in unnecessary loss of capacity, particularly when the read error results from a transitory condition that can be remedied. It may be beneficial to be able to disable a defecting process to preserve capacity, particularly when redundant data is available.

Figure 16A:
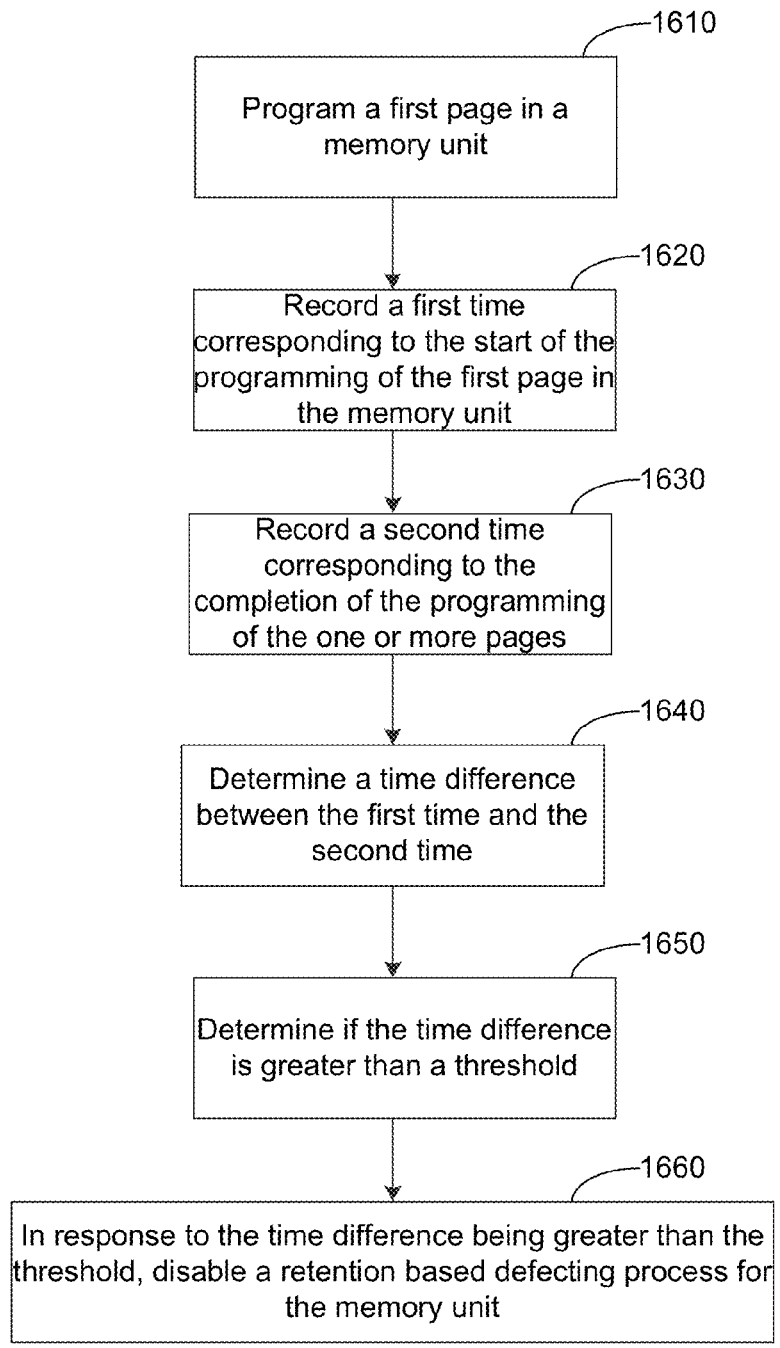
FIG. 16A illustrates a process for disabling a defecting process in accordance with various aspects.

FIG. 16A illustrates a process for disabling a defecting process. A first page in a memory unit is programmed 1610. A first time ($t_1$) is recorded 1620. The first time corresponds to the start of the programming of the first page in the memory unit. According to various implementations, the memory unit corresponds to a garbage collection unit (GCU). A second time ($t_2$) is recorded 1630 that corresponds to the completion of the programming of one or more pages. A time difference ($\Delta t = t_2 - t_1$) is determined 1640 between the first time and the second time. It is determined 1650 whether the time difference is greater than a threshold. The threshold may be dependent on various factors. For example, the threshold may be a function of the retention time of the data stored in the memory unit. For example, the threshold may be higher if the retention time of the data stored in the memory unit is approaching the retention time indicated in the product specification, e.g. 3 days or months. According to various implementations, the threshold is in between 50% of the retention time recorded in the product specification (t_retention_spec) and the t_retention_spec such that 50% of t_retention_spec<$\Delta t$<t_retention_spec, for example. According to various implementations, the threshold is 80% of t_retention_spec.

In response to the time difference being greater than the threshold, a retention based defecting process is disabled 1660 for the memory unit. A larger time difference may indicate that the memory unit has a large relaxation time. A relaxation time is the time duration between two sequential program or erase events of the same memory unit. A larger relaxation time may indicate that the memory unit has less damage than other memory units. According to various aspects, the time difference being greater than the threshold indicates that the chance for the memory unit to have a read failure is low.

In some implementations, the threshold may be a function of more than one factor. For example, the threshold may be a function of one or more of the retention time, the number of program/erase cycles experienced by the memory unit, and/or the temperature of the memory unit. If the threshold is a function of more than one factor, a similar process may be used to the process shown in FIG. 16A for each of the factors. Alternatively, weighting coefficients can be applied to the factors, the weighted factors can be combined and compared to a composite threshold. In some cases, the process of determining whether to disable a defecting process if the time difference is greater than a threshold (see blocks 1650 and 1660) may be checked periodically. Alternatively or additionally disabling the defecting process may be performed in response to a read error in the memory unit, for example. In some cases, the process of FIG. 16A is carried out in conjunction with a garbage collection operation.

In the event that the time difference is less than the threshold, the memory unit may be defected because the chance of a read error occurring is high, for example. In some cases, if the time difference is less than the threshold and a read error occurs, a counter is incremented. If the value in the counter rises above a threshold, e.g. 2 or 4, the memory unit may be defected during the next garbage collection process, for example.

Figure 16B:
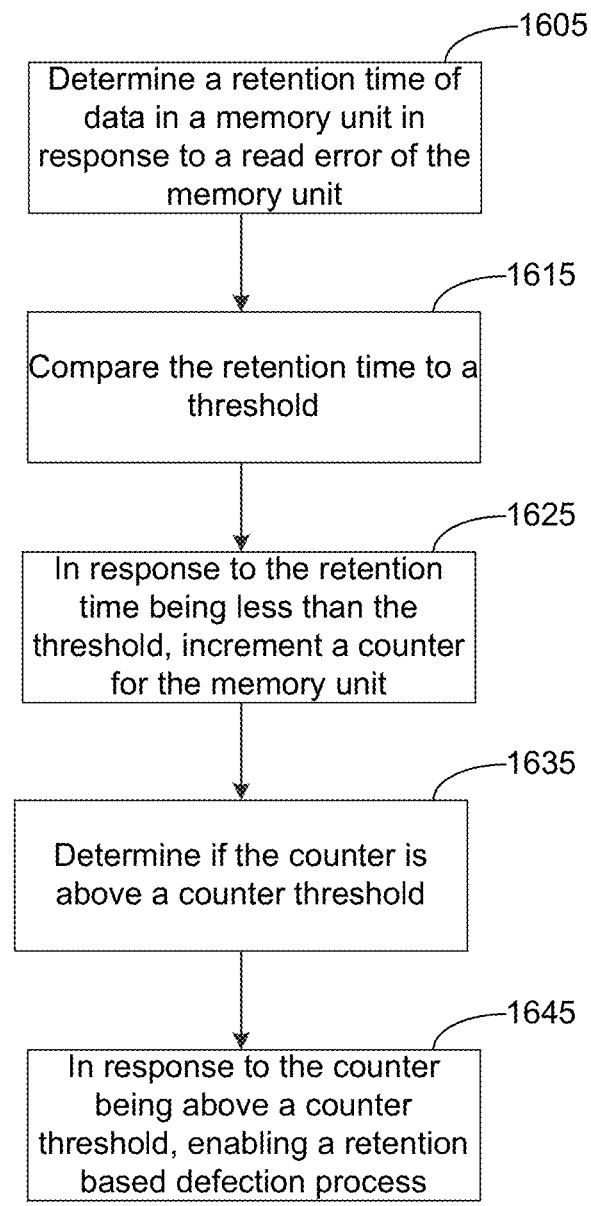
FIG. 16B shows a process for utilizing a counter to enable or disable a defecting process according to some implementations.

FIG. 16B shows a process for utilizing a counter to enable or disable a defecting process. A retention time of data in a memory unit is determined 1605 in response to a read error. The retention time of the memory unit is compared 1615 to a threshold. In response to the retention time being less than the threshold, a counter for the memory unit is incremented 1625. It is determined 1635 whether the counter is above a counter threshold. In response to the counter being above the counter threshold, a retention based defecting process is enabled 1645. The retention based defecting process is disabled while the counter is below a threshold.

Figure 17:
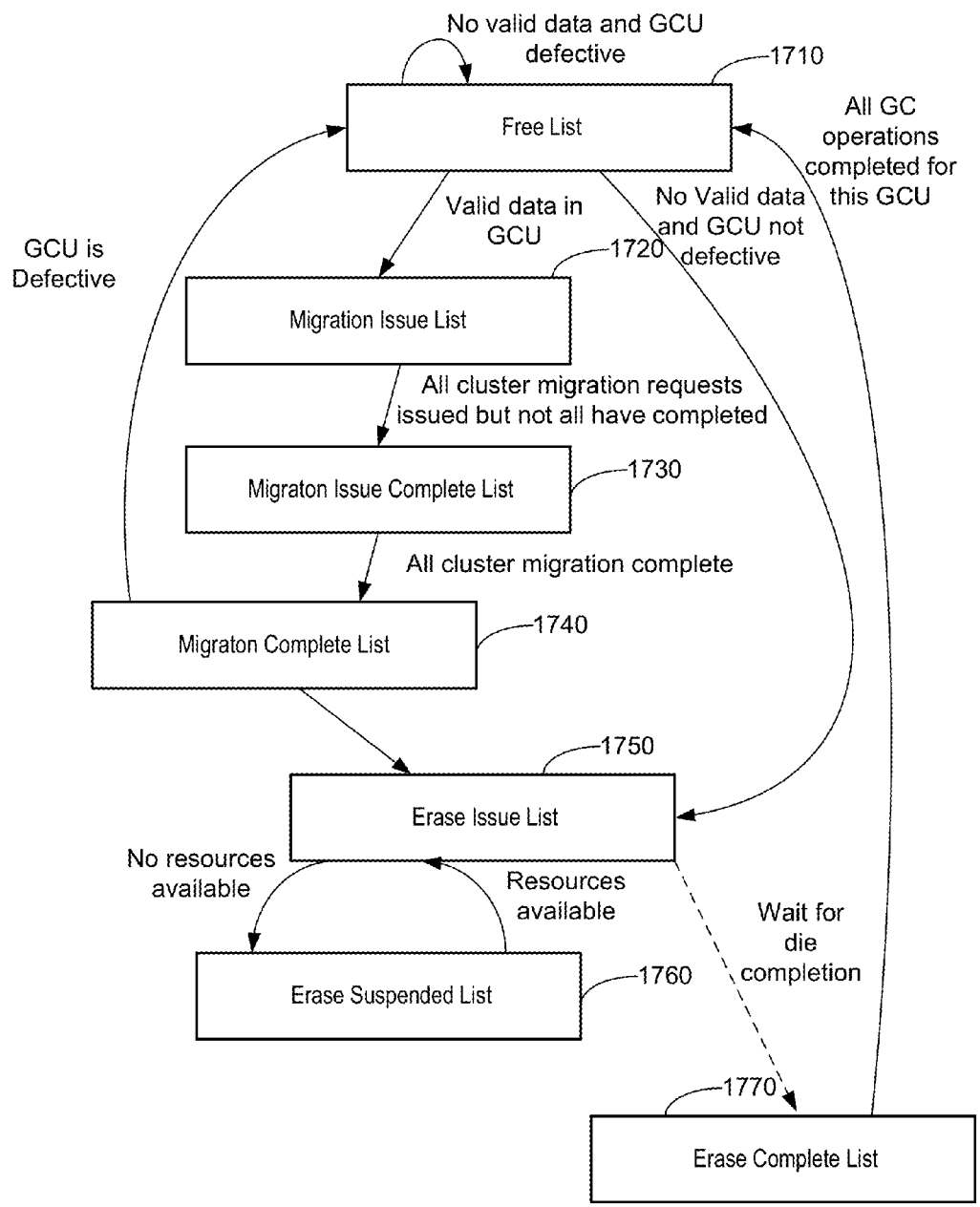
FIG. 17 illustrates another example of cluster migration in conjunction with a garbage collection process according to some embodiments.

According to various implementations uses one or more lists to carry out the embodiments described herein. These list can be used in the scheduling of various tasks and/or for assigning a priority to tasks, for example. FIG. 17 illustrates another example of cluster migration in conjunction with a garbage collection process that utilizes various lists to aide in the garbage collection process. When the garbage collection process is initiated, the system checks whether there is valid data in the candidate GCU from the Free List 1710 and whether the candidate GCU is defective. If there is no valid data in the candidate GCU and the candidate GCU is defective, the system continues on to the next candidate GCU. If there is valid data in the candidate GCU and the GCU is not defective, the GCU is moved to the Migration Issue List 1720. Once all of the cluster migration requests for the GCU have been issued, but not yet completed, the GCU is moved to the Issue Complete List 1730. The GCU is moved to the Migration Complete List 1740 once the cluster migration request is complete. If the GCU is determined to be defective the system returns to the Free List 1710 to process the next candidate GCU. Once the data migration is complete, an erase is issued for the GCU and the GCU is placed in the Erase Issue List 1750. If there are not currently enough resources for the erase, the GCU is placed in the Erase Suspended List 1760 until the resources are available. If there are enough resources available for the erase, the erase is completed and the GCU is placed in the Erase Complete List 1770. Once the erase is complete for the GCU, the system returns to the Free List 1710 to determine the next candidate GCU for garbage collection. In the event that there is no valid data and the GCU is not defective, the cluster migration does not have to be completed, and the GCU moves to the Erase Issue List 1750.

It is to be understood that this detailed description is illustrative only, and various additions and/or modifications may be made to these embodiments, especially in matters of structure and arrangements of parts and/or processes. Accordingly, the scope of the present disclosure should not be limited by the particular embodiments described above, but should be defined by the claims set forth below and equivalents thereof.

What is claimed is:

1. A device, comprising:
    a primary memory comprising a host memory space arranged as memory sectors corresponding to host logical block addresses (LBAs);
    a secondary memory implemented as a cache for the primary host memory;
    a hybrid controller configured to:
        receive incoming memory access requests from a host processor and to manage outgoing memory access requests routed to the secondary memory;
        receive the incoming memory access requests from the host processor, the incoming memory access requests including a range of LBAs;
        route the incoming memory access requests to a set of incoming queues by implementing a priority scheme, the set of incoming queues comprising an incoming execute queue, the priority scheme comprising:
            routing invalidate requests in an invalidate ready queue to the execute queue as a highest priority;
            routing read requests in a read ready queue to the execute queue as a second highest priority; and
            routing promotion requests in a promotion ready queue as a third highest priority;
        directly map clusters of host LBAs to clusters of secondary memory, the secondary memory clusters corresponding to a memory space of the cache, the mapping of the host LBA clusters to the secondary memory clusters being fully associative wherein any host LBA cluster can be mapped to any secondary memory cluster;
        responsive to a promotion request that specifies a cluster aligned host LBA range, use the mapping of the host LBA clusters to the cache clusters to determine if the host LBA range corresponds to one or more overlapped cache clusters present in the secondary memory;
        if the host LBA range corresponds to the one or more overlapped cache clusters, create a bitmap of the overlapped cache clusters; and
        implement a write operation to the secondary memory using the bitmap to skip writing the overlapped cache clusters to the secondary memory.

2. The device of claim 1, wherein the host LBA clusters comprise n contiguous host LBAs.

3. The device of claim 2, wherein each host LBA is mapped to only one secondary memory cluster at any particular time.

4. The device of claim 2, wherein a hash table maps the host LBA clusters to the secondary memory clusters.

5. The device of claim 4, wherein each entry in the hash table points to one or more secondary memory clusters.

6. The device of claim 3, wherein the hybrid controller is configured to implement one or more of:
    a look up request that determines whether a host LBA range is present within the secondary memory;
    a read request that reads a host LBA range from the secondary memory;
    a promote request that promotes a cluster-aligned host LBA range to the secondary memory; and
    an invalidate command that invalidates a cluster-aligned host LBA range in the secondary memory.

7. The device of claim 1, wherein the secondary memory is flash memory and has n planes.

8. The device of claim 7, wherein the secondary memory cluster comprises one or more map units.

9. The device of claim 8, wherein the map unit comprises n pages.

10. A method, comprising:
    receiving incoming memory access requests from a host processor, the incoming memory access requests including a range of host logical block addresses (LBAs) corresponding to a host LBA space to cache clusters, the host LBA space corresponding to a memory space of a primary memory and the cache clusters corresponding to memory space of a secondary memory arranged to operate as a fully associative cache for the primary memory, wherein any host LBA cluster can be mapped to any cache cluster;
    routing the incoming memory access requests to a set of incoming queues by implementing a priority scheme, the set of incoming queues comprising an incoming execute queue, the priority scheme comprising:
        routing invalidate requests in an invalidate ready queue to the execute queue as a highest priority;
        routing read requests in a read ready queue to the execute queue as a second highest priority; and
        routing promotion requests in a promotion ready queue as a third highest priority;
    directly mapping the clusters of LBA to cache clusters
    responsive to a promotion request that specifies a cluster aligned host LBA range, using the mapping of the host LBA clusters to the cache clusters to determine if the host LBA range corresponds to one or more overlapped cache clusters present in the secondary memory; and
    if the host LBA range corresponds to the one or more overlapped cache clusters, creating a bitmap of the overlapped cache clusters; and
    implementing a write operation to the secondary memory using the bitmap to skip writing the overlapped cache clusters to the secondary memory.

11. The method of claim 10, wherein mapping the host LBA clusters to cache clusters comprises implementing a hash function to determine an index to a hash table, the index pointing to one or more cache clusters.

12. The method of claim 10, wherein:
    clustering the host LBAs comprises clustering the host LBAs into clusters of n contiguous host LBAs; and
    mapping the host LBA clusters to cache clusters comprises mapping the host LBA clusters to cache cluster comprising n contiguous cache clusters.

13. The method of claim 10, further comprising:
    responsive to a read request that specifies a host LBA range, using the mapping of the host LBA clusters to the cache clusters to determine if the host LBA range corresponds to cache clusters present in the secondary memory; and
    reading the cache clusters if the cache clusters are present in the secondary memory.

14. The method of claim 10, wherein any host LBA cluster can be mapped to any cache cluster if the secondary memory is not saturated.

15. The method of claim 10, further comprising:
responsive to a promotion request that involves a cluster aligned host LBA range, determining if the secondary memory is saturated;
evicting a number of cache clusters if the secondary memory is saturated; and
allocating cache clusters for the promotion request; and writing the host LBA range to the secondary memory.

16. The method of claim 10, further comprising:
responsive to a invalidate request that involves a cluster aligned host LBA range, using the mapping of the host LBA clusters to the cache clusters to invalidate cache clusters that correspond to the cluster aligned host LBA range.

17. A controller system for a hybrid memory system, the controller comprising:
a hybrid controller configured data transfers between the host processor and a flash memory, the flash memory configured to serve as a cache for a magnetic disk, the hybrid controller comprising:
a flash control and transfer management (FCTM) layer configured to:
receive incoming memory access requests from a host processor and to manage outgoing memory access requests routed to the cache;
receive the incoming memory access requests from the host processor, the incoming memory access requests including a range of LBAs;
route the incoming memory access requests to a set of incoming queues by implementing a priority scheme, the set of incoming queues comprising an incoming execute queue, the priority scheme comprising:
routing invalidate requests in a invalidate ready queue to the execute queue as a highest priority;
routing read requests in a read ready queue to the execute queue as a second highest priority; and
routing promotion requests in a promotion ready queue as a third highest priority;
directly map clusters of host logical block addresses (LBAs) corresponding to a host LBA space to cache clusters, the host LBA space corresponding to a memory space of a primary memory and the cache clusters corresponding to memory space of a secondary memory arranged to operate as a fully associative cache for the primary memory, wherein any host LBA cluster can be mapped to any cache cluster;
responsive to a promotion request that specifies a cluster aligned host LBA range, use the mapping of the host LBA clusters to the cache clusters to determine if the host LBA range corresponds to one or more overlapped cache clusters present in the secondary memory; and
if the host LBA range corresponds to the one or more overlapped cache clusters, create a bitmap of the overlapped cache clusters; and
implement a write operation to the secondary memory using the bitmap to skip writing the overlapped cache clusters to the secondary memory.

18. The controller system of claim 17, wherein the host LBA clusters comprise n contiguous host LBAs.

19. The method of claim 17, wherein the FCTM layer is configured to directly map the host LBA clusters to cache clusters by implementing a hash function to determine an index to a hash table, the index pointing to one or more cache clusters.

* * * * *